US012762028B2

(12) United States Patent
Starszyk et al.

(10) Patent No.: US 12,762,028 B2
(45) **Date of Patent: *Oct. 13, 2026**

(54) FAULT TOLERANT LOGGING FOR ARTIFICIAL INTELLIGENCE APPLICATIONS

(71) Applicant: The Toronto-Dominion Bank, Toronto (CA)

(72) Inventors: Peter Starszyk, Waterloo (CA); Devinder Kumar, Toronto (CA); Maksims Volkovs, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 34 days.

This patent is subject to a terminal disclaimer.

(21) Appl. No.: 18/813,641

(22) Filed: Aug. 23, 2024

(65) Prior Publication Data

US 2026/0056853 A1 Feb. 26, 2026

(51) Int. Cl.
*G06F 11/20* (2006.01)
*G06F 17/40* (2006.01)

(52) U.S. Cl.
CPC .......... *G06F 11/2025* (2013.01); *G06F 17/40* (2013.01); *G06F 2201/805* (2013.01)

(58) Field of Classification Search
CPC . G06F 11/2025; G06F 17/40; G06F 2201/805
See application file for complete search history.

(56) References Cited

U.S. PATENT DOCUMENTS

| | | | |
|---|---|---|---|
| 9,864,982 | B2 | 1/2018 | Bristow et al. |
| 10,163,085 | B2 | 12/2018 | D'Agostino et al. |
| 10,178,246 | B1 | 1/2019 | Horvath et al. |
| 10,181,114 | B2 | 1/2019 | Tseretopoulos et al. |
| 10,339,931 | B2 | 7/2019 | Tseretopoulos et al. |
| 10,346,824 | B2 | 7/2019 | Chan et al. |
| 10,360,303 | B2 | 7/2019 | Volkovs et al. |

(Continued)

OTHER PUBLICATIONS

Klein, Cory. Does a TCP socket connection have a 'keep alive'? StackOverflow. Nov. 14, 2022. Retrieved from the Internet <URL: https://stackoverflow.com/questions/1480236/does-a-tcp-socket-connection-have-a-keep-alive> (Year: 2022).*

(Continued)

*Primary Examiner* — Ashish Thomas
*Assistant Examiner* — Bryan P Huang

(57) ABSTRACT

An example operation may include one or more of executing a worker on a server host, wherein the worker comprises a log messenger and at least one processing thread, executing a message broker on the server host, wherein the message broker is decoupled from the worker and comprises a queue, executing at least one artificial intelligence (AI) pipeline via the at least one processing thread of the worker, wherein the at least one AI pipeline is configured to generate log messages, transferring the log messages from the log messenger to the message broker, storing the log messages within the queue of the message broker, determining, by the message broker, that a log message from among the log messages has reached an end of the queue, and in response to a determination that the log message has reached the end of the queue, writing, by the message broker, the log message to a log database.

20 Claims, 18 Drawing Sheets

(56) References Cited

U.S. PATENT DOCUMENTS 10,405,146 B1 9/2019 Kuruvilla et al.
10,438,206 B2 10/2019 Jivraj et al.
10,440,196 B2 10/2019 Horvath et al.
10,440,197 B2 10/2019 Horvath et al.
10,460,748 B2 10/2019 Tseretopoulos et al.
10,482,675 B1 11/2019 Sutter et al.
10,659,400 B2 5/2020 Moon et al.
10,698,902 B2 6/2020 Tseretopoulos et al.
10,706,635 B2 7/2020 Sutter et al.
10,708,721 B2 7/2020 Kuruvilla et al.
10,728,259 B2 7/2020 McCarter et al.
10,776,619 B2 9/2020 Collinson et al.
10,824,941 B2 11/2020 Volkovs et al.
10,831,923 B2 11/2020 Dunjic et al.
10,832,047 B2 11/2020 Moghtadai
10,862,897 B2 12/2020 D'Agostino et al.
10,867,292 B2 12/2020 Lin et al.
10,867,293 B2 12/2020 Bristow et al.
10,878,816 B2 12/2020 Tseretopoulos et al.
10,902,220 B2 1/2021 Lozon et al.
10,922,665 B2 2/2021 Miller et al.
10,943,605 B2 3/2021 Tseretopoulos et al.
10,977,617 B2 4/2021 Tseretopoulos et al.
11,004,187 B2 5/2021 Kuruvilla et al.
11,017,028 B2 5/2021 Dunjic et al.
11,030,415 B2 6/2021 Volkovs et al.
11,055,924 B2 7/2021 Navarro et al.
11,061,638 B2 7/2021 Lam
11,070,448 B2 7/2021 Miller et al.
11,087,314 B2 8/2021 Gandhi et al.
11,100,168 B2 8/2021 Miller et al.
11,140,143 B2 10/2021 Moon et al.
11,144,921 B2 10/2021 Dunjic et al.
11,144,998 B2 10/2021 Kuruvilla et al.
11,145,169 B2 10/2021 Pratten et al.
11,182,860 B2 11/2021 Kuruvilla et al.
11,200,328 B2 12/2021 Shpurov et al.
11,200,411 B2 12/2021 Rizvi et al.
11,210,857 B2 12/2021 Rizvi et al.
11,222,286 B2 1/2022 Choe et al.
11,232,304 B2 1/2022 Navarro et al.
11,276,257 B2 3/2022 Moghtadai et al.
11,303,642 B2 4/2022 Dunjic et al.
11,334,574 B2 5/2022 Caputo et al.
11,347,744 B2 5/2022 Tseretopoulos et al.
11,349,871 B2 5/2022 Moon et al.
11,354,442 B2 6/2022 Haldenby et al.
11,361,566 B2 6/2022 Collinson et al.
11,373,229 B2 6/2022 Tseretopoulos et al.
11,392,776 B2 7/2022 Lozon et al.
11,393,020 B2 7/2022 Mathew et al.
11,394,668 B1 7/2022 Subbunarayanan et al.
11,397,765 B2 7/2022 Volkovs et al.
11,409,811 B2 8/2022 D'Agostino
11,411,734 B2 8/2022 Shpurov et al.
11,430,242 B2 8/2022 Moghtadai
11,436,809 B2 9/2022 Rizvi et al.
11,451,669 B1 9/2022 Navarro et al.
11,469,878 B2 10/2022 Shpurov et al.
11,470,091 B2 10/2022 McCarter et al.
11,470,143 B2 10/2022 Joheb et al.
11,475,059 B2 10/2022 Liu et al.
11,475,251 B2 10/2022 Morin et al.
11,477,265 B2 10/2022 McPhee et al.
11,507,622 B2 11/2022 Grebenisan et al.
11,507,868 B2 11/2022 Kwong et al.
11,546,345 B2 1/2023 D'Agostino et al.
11,580,762 B2 2/2023 Rizvi et al.
11,600,064 B2 3/2023 Navarro et al.
11,604,899 B2 3/2023 Haldenby et al.
11,620,741 B2 4/2023 Kuruvilla et al.
11,632,311 B2 4/2023 Miller et al.
11,651,100 B2 5/2023 Dunjic et al.
11,663,488 B2 5/2023 Volkovs et al.
11,671,536 B2 6/2023 Navarro et al.
11,687,995 B2 6/2023 Tseretopoulos et al.
11,689,484 B2 6/2023 Moon et al.
11,704,782 B2 7/2023 Wakim et al.
11,741,305 B2 8/2023 Skaljin et al.
11,743,210 B2 8/2023 Moon et al.
11,748,400 B2 9/2023 Volkovs et al.
11,756,388 B2 9/2023 Pratten et al.
11,777,918 B2 10/2023 Moon et al.
11,782,935 B2 10/2023 Caputo et al.
11,789,909 B2 10/2023 Grebenisan et al.
11,790,012 B2 10/2023 D'Agostino
11,790,354 B2 10/2023 Gandhi et al.
11,797,962 B2 10/2023 Jones et al.
11,809,486 B2 11/2023 Liu et al.
11,809,577 B2 11/2023 Begg et al.
11,811,826 B2 11/2023 Moon et al.
11,842,252 B2 12/2023 Kuang et al.
11,875,398 B2 1/2024 Pratten et al.
11,880,811 B2 1/2024 Pawelkiewicz et al.
11,886,764 B2 1/2024 Lam
11,928,112 B2 3/2024 Dunjic et al.
11,941,525 B2 3/2024 Morin et al.
11,941,703 B2 3/2024 Kuruvilla et al.
11,955,117 B2 4/2024 McDermid et al.
11,966,491 B2 4/2024 D'Agostino
11,978,085 B2 5/2024 Rai et al.
11,978,090 B2 5/2024 Navarro et al.
11,985,153 B2 5/2024 Karl
11,995,121 B2 5/2024 Volkovs et al.
12,008,315 B2 6/2024 Miller et al.
12,014,303 B2 6/2024 Carvalho et al.
12,019,594 B2 6/2024 Floyd et al.
12,021,874 B2 6/2024 Dunjic et al.
12,039,535 B2 7/2024 Dunjic et al.
12,052,363 B2 7/2024 Shpurov et al.
12,061,652 B2 8/2024 Miller et al.
12,067,130 B2 8/2024 Shpurov et al.
12,067,580 B2 8/2024 Jeske et al.
12,079,351 B2 9/2024 Begg et al.
12,106,220 B2 10/2024 Volkovs et al.
12,111,793 B2 10/2024 Grebenisan et al.
12,124,925 B2 10/2024 Rho et al.
12,136,079 B2 11/2024 Jones et al.
12,164,542 B1 12/2024 Rahman et al.
12,169,693 B2 12/2024 Lu
12,182,800 B2 12/2024 Navarro et al.
12,198,109 B2 1/2025 Abbas
12,198,510 B2 1/2025 Pratten et al.
12,210,534 B2 1/2025 Cashion et al.
12,211,274 B2 1/2025 Ma et al.
12,217,011 B2 2/2025 Luo et al.
12,223,549 B2 2/2025 Bouëtté et al.
12,229,690 B2 2/2025 Stanevich et al.
12,254,512 B2 3/2025 Heglin et al.
12,282,785 B2 4/2025 Karbasi et al.
12,288,236 B2 4/2025 Volkovs et al.
12,299,149 B2 5/2025 Nikoghossian et al.
12,316,715 B2 5/2025 Taheri et al.
12,321,861 B2 6/2025 Volkovs et al.
12,326,856 B2 6/2025 Mohammed et al.
12,333,354 B2 6/2025 Mohammed et al.
12,353,969 B2 7/2025 Kuang et al.
12,354,094 B2 7/2025 Jones et al.
12,373,795 B2 7/2025 Misler et al.
2018/0268818 A1 9/2018 Schoenmackers et al.
2019/0172045 A1 6/2019 Dunjic et al.
2020/0058068 A1 2/2020 Gandhi et al.
2021/0027160 A1 1/2021 Volkovs et al.
2021/0037040 A1 2/2021 Aleks et al.
2021/0117893 A1 4/2021 Sohum et al.
2021/0232950 A1 7/2021 Kono
2021/0264461 A1 8/2021 Fam
2021/0407016 A1 12/2021 Kuruvilla et al.
2022/0058489 A1 2/2022 Volkovs et al.
2022/0108069 A1 4/2022 Lee
2022/0157094 A1 5/2022 Moghtadai et al.
2022/0172083 A1 6/2022 Wu et al.
2022/0188705 A1 6/2022 Davoodi et al.
2022/0198411 A1 6/2022 Jones et al.

(56) References Cited

U.S. PATENT DOCUMENTS

| | | | |
|---|---|---|---|
| 2022/0198432 | A1 | 6/2022 | Jones et al. |
| 2022/0198445 | A1 | 6/2022 | Jones et al. |
| 2022/0207295 | A1 | 6/2022 | Stanevich et al. |
| 2022/0207430 | A1 | 6/2022 | Dickie et al. |
| 2022/0207432 | A1 | 6/2022 | Whelan et al. |
| 2022/0207606 | A1 | 6/2022 | Dickie et al. |
| 2022/0245060 | A1 | 8/2022 | Kathuria et al. |
| 2022/0270155 | A1 | 8/2022 | Volkovs et al. |
| 2022/0277213 | A1 | 9/2022 | Braviner et al. |
| 2022/0277227 | A1 | 9/2022 | Yu et al. |
| 2022/0277323 | A1 | 9/2022 | Whelan et al. |
| 2022/0284450 | A1 | 9/2022 | Asta et al. |
| 2022/0300903 | A1 | 9/2022 | Huang et al. |
| 2022/0309573 | A1 | 9/2022 | Mathew et al. |
| 2022/0318573 | A1 | 10/2022 | Smith et al. |
| 2022/0318617 | A1 | 10/2022 | Wong et al. |
| 2022/0327397 | A1 | 10/2022 | Braviner et al. |
| 2022/0327430 | A1 | 10/2022 | Zuberi et al. |
| 2022/0327431 | A1 | 10/2022 | Braviner et al. |
| 2022/0327432 | A1 | 10/2022 | Gutierrez Bugarin et al. |
| 2022/0327625 | A1 | 10/2022 | Leung et al. |
| 2022/0335718 | A1 | 10/2022 | Ma et al. |
| 2022/0343422 | A1 | 10/2022 | Zuberi et al. |
| 2022/0366064 | A1 | 11/2022 | Nikoghossian et al. |
| 2022/0383301 | A1 | 12/2022 | Jones et al. |
| 2022/0383313 | A1 | 12/2022 | Jones et al. |
| 2022/0383314 | A1 | 12/2022 | Jones et al. |
| 2022/0405299 | A1 | 12/2022 | Leung et al. |
| 2022/0414495 | A1 | 12/2022 | Stanevich et al. |
| 2023/0006809 | A1 | 1/2023 | Shpurov et al. |
| 2023/0007075 | A1 | 1/2023 | Mcphee et al. |
| 2023/0011451 | A1 | 1/2023 | Lu |
| 2023/0048437 | A1 | 2/2023 | Karbasi et al. |
| 2023/0083899 | A1 | 3/2023 | Gandouet et al. |
| 2023/0086653 | A1 | 3/2023 | Zykh et al. |
| 2023/0107703 | A1 | 4/2023 | Zhang et al. |
| 2023/0113752 | A1 | 4/2023 | Jorlett et al. |
| 2023/0119108 | A1 | 4/2023 | Volkovs et al. |
| 2023/0131935 | A1 | 4/2023 | Volkovs et al. |
| 2023/0153461 | A1 | 5/2023 | Kalra et al. |
| 2023/0195734 | A1 | 6/2023 | Cashion et al. |
| 2023/0196406 | A1 | 6/2023 | Gandouet et al. |
| 2023/0244917 | A1 | 8/2023 | Loaiza Ganem et al. |
| 2023/0244962 | A1 | 8/2023 | Volkovs et al. |
| 2023/0252301 | A1 | 8/2023 | Volkovs et al. |
| 2023/0259883 | A1 | 8/2023 | Misler et al. |
| 2023/0267367 | A1 | 8/2023 | Volkovs et al. |
| 2023/0267475 | A1 | 8/2023 | Navarro et al. |
| 2023/0306434 | A1 | 9/2023 | Dunjic et al. |
| 2023/0316485 | A1 | 10/2023 | Wakim et al. |
| 2023/0318994 | A1 | 10/2023 | Moon et al. |
| 2023/0336615 | A1 | 10/2023 | Joheb et al. |
| 2023/0342481 | A1 | 10/2023 | Nikoghossian et al. |
| 2023/0344814 | A1 | 10/2023 | Moon et al. |
| 2023/0351116 | A1 | 11/2023 | Skaljin et al. |
| 2023/0368048 | A1 | 11/2023 | Yang et al. |
| 2023/0377047 | A1 | 11/2023 | Bouëtté et al. |
| 2023/0385693 | A1 | 11/2023 | Cresswell et al. |
| 2023/0385694 | A1 | 11/2023 | Cresswell et al. |
| 2023/0386190 | A1 | 11/2023 | Cresswell et al. |
| 2023/0394452 | A1 | 12/2023 | Jones et al. |
| 2023/0401192 | A1 | 12/2023 | Yang et al. |
| 2023/0401553 | A1 | 12/2023 | Navarro et al. |
| 2023/0401572 | A1 | 12/2023 | Navarro et al. |
| 2023/0419302 | A1 | 12/2023 | Navarro et al. |
| 2023/0419402 | A1 | 12/2023 | Ghelichi et al. |
| 2024/0020534 | A1 | 1/2024 | Perez Vallejo et al. |
| 2024/0062117 | A1 | 2/2024 | Kuang et al. |
| 2024/0106851 | A1 | 3/2024 | Kennedy et al. |
| 2024/0119346 | A1 | 4/2024 | Chang et al. |
| 2024/0126575 | A1 | 4/2024 | Kiriakou et al. |
| 2024/0127036 | A1 | 4/2024 | Zuberi et al. |
| 2024/0127214 | A1 | 4/2024 | Wander et al. |
| 2024/0193562 | A1 | 6/2024 | Pratten et al. |
| 2024/0202756 | A1 | 6/2024 | Karl et al. |
| 2024/0203405 | A1 | 6/2024 | McDermid et al. |
| 2024/0211732 | A1 | 6/2024 | Wander et al. |
| 2024/0212049 | A1 | 6/2024 | Ghelichi et al. |
| 2024/0220653 | A1 | 7/2024 | D'Agostino |
| 2024/0232614 | A1 | 7/2024 | Esmaeili et al. |
| 2024/0232950 | A1 | 7/2024 | Navarro et al. |
| 2024/0249310 | A1 | 7/2024 | Rai et al. |
| 2024/0256903 | A1 | 8/2024 | Ens et al. |
| 2024/0256904 | A1 | 8/2024 | Leung et al. |
| 2024/0256968 | A1 | 8/2024 | Hosseinzadeh et al. |
| 2024/0265055 | A1 | 8/2024 | Purkayastha |
| 2024/0281467 | A1 | 8/2024 | Volkovs et al. |
| 2024/0281808 | A1 | 8/2024 | Vouitsis et al. |
| 2024/0281818 | A1 | 8/2024 | Golestan Irani et al. |
| 2024/0289645 | A1 | 8/2024 | Makhijani et al. |
| 2024/0289876 | A1 | 8/2024 | Mathew et al. |
| 2024/0303551 | A1 | 9/2024 | Li et al. |
| 2024/0304182 | A1 | 9/2024 | Hamilton et al. |
| 2024/0330772 | A1 | 10/2024 | Cresswell et al. |
| 2024/0330809 | A1 | 10/2024 | Carvalho et al. |
| 2024/0338520 | A1 | 10/2024 | Misler et al. |
| 2024/0346338 | A1 | 10/2024 | Desai et al. |
| 2024/0370880 | A1 | 11/2024 | Jeske et al. |
| 2024/0370881 | A1 | 11/2024 | Jeske et al. |
| 2024/0385838 | A1 | 11/2024 | Yu et al. |
| 2024/0386295 | A1 | 11/2024 | Yu et al. |
| 2024/0386325 | A1 | 11/2024 | Yu et al. |
| 2024/0386326 | A1 | 11/2024 | Yu et al. |
| 2024/0386427 | A1 | 11/2024 | Abbas et al. |
| 2024/0394569 | A1 | 11/2024 | Farhadi Hassan Kiadeh et al. |
| 2024/0394588 | A1 | 11/2024 | Heglan et al. |
| 2024/0403702 | A1 | 12/2024 | Deljavan Farshi |
| 2024/0403862 | A1 | 12/2024 | Abbas et al. |
| 2024/0412069 | A1 | 12/2024 | Volkovs et al. |
| 2024/0412078 | A1 | 12/2024 | Ghelichi et al. |
| 2024/0412083 | A1 | 12/2024 | Starszyk et al. |
| 2024/0419978 | A1 | 12/2024 | Stein et al. |
| 2024/0420010 | A1 | 12/2024 | Cirulis et al. |
| 2024/0420011 | A1 | 12/2024 | Cirulis et al. |
| 2024/0428283 | A1 | 12/2024 | Belbahri et al. |
| 2025/0013363 | A1 | 1/2025 | Estoesta et al. |
| 2025/0013697 | A1 | 1/2025 | Estoesta et al. |
| 2025/0013927 | A1 | 1/2025 | Rho et al. |
| 2025/0014010 | A1 | 1/2025 | Jones et al. |
| 2025/0014052 | A1 | 1/2025 | Bhattacharjee et al. |
| 2025/0028852 | A1 | 1/2025 | Chowanski et al. |
| 2025/0028934 | A1 | 1/2025 | Wong et al. |
| 2025/0029012 | A1 | 1/2025 | Rho et al. |
| 2025/0045601 | A1 | 2/2025 | Zuberi et al. |
| 2025/0053387 | A1 | 2/2025 | Wang et al. |
| 2025/0068646 | A1 | 2/2025 | Rahman et al. |
| 2025/0068853 | A1 | 2/2025 | Lu |
| 2025/0069063 | A1 | 2/2025 | Navarro et al. |
| 2025/0077187 | A1 | 3/2025 | Guttridge et al. |
| 2025/0077188 | A1 | 3/2025 | Guttridge et al. |
| 2025/0077189 | A1 | 3/2025 | Guttridge et al. |
| 2025/0077190 | A1 | 3/2025 | Guttridge et al. |
| 2025/0077204 | A1 | 3/2025 | Guttridge et al. |
| 2025/0077227 | A1 | 3/2025 | Guttridge et al. |
| 2025/0077396 | A1 | 3/2025 | Sen |
| 2025/0077397 | A1 | 3/2025 | Sen |
| 2025/0077399 | A1 | 3/2025 | Sen |
| 2025/0077400 | A1 | 3/2025 | Sen |
| 2025/0077556 | A1 | 3/2025 | Guttridge et al. |
| 2025/0077681 | A1 | 3/2025 | Sen |
| 2025/0077682 | A1 | 3/2025 | Guttridge et al. |
| 2025/0077939 | A1 | 3/2025 | Tabatabaei et al. |
| 2025/0078324 | A1 | 3/2025 | Gormley |
| 2025/0078325 | A1 | 3/2025 | Gormley |
| 2025/0078344 | A1 | 3/2025 | Gormley |
| 2025/0078345 | A1 | 3/2025 | Gormley |
| 2025/0078972 | A1 | 3/2025 | Gormley |
| 2025/0085936 | A1 | 3/2025 | Guttridge et al. |
| 2025/0086096 | A1 | 3/2025 | Guttridge et al. |
| 2025/0086440 | A1 | 3/2025 | Erb et al. |
| 2025/0086441 | A1 | 3/2025 | Guttridge et al. |
| 2025/0086451 | A1 | 3/2025 | Guttridge et al. |
| 2025/0086551 | A1 | 3/2025 | Zhao |
| 2025/0094437 | A1 | 3/2025 | Upendran |

(56) References Cited

U.S. PATENT DOCUMENTS

2025/0103609 A1 3/2025 Upendran
2025/0103961 A1 3/2025 Cresswell et al.
2025/0103980 A1 3/2025 Deljavan Farshi et al.
2025/0104024 A1 3/2025 Abbas
2025/0104029 A1 3/2025 Deljavan Farshi et al.
2025/0104047 A1 3/2025 Mashkevich
2025/0104050 A1 3/2025 Mashkevich
2025/0104059 A1 3/2025 Mashkevich
2025/0104074 A1 3/2025 Tsang et al.
2025/0104306 A1 3/2025 Mashkevich
2025/0104700 A1 3/2025 Henault-Ethier et al.
2025/0106060 A1 3/2025 Gormley et al.
2025/0106201 A1 3/2025 Gormley
2025/0110805 A1 4/2025 Starszyk et al.
2025/0117411 A1 4/2025 Mohammed
2025/0117595 A1 4/2025 Taheri
2025/0117596 A1 4/2025 Taheri
2025/0117623 A1 4/2025 Devarajan et al.
2025/0117629 A1 4/2025 Pandey et al.
2025/0117630 A1 4/2025 Taheri
2025/0117769 A1 4/2025 Taheri
2025/0117836 A1 4/2025 Taheri et al.
2025/0117853 A1 4/2025 Pandey et al.
2025/0117854 A1 4/2025 Pandey et al.
2025/0117855 A1 4/2025 Pandey et al.
2025/0117856 A1 4/2025 Pandey et al.
2025/0119396 A1 4/2025 Taheri
2025/0119494 A1 4/2025 Pandey et al.
2025/0119495 A1 4/2025 Pandey et al.
2025/0124039 A1 4/2025 Cashion et al.
2025/0124240 A1 4/2025 Luo et al.
2025/0131718 A1 4/2025 Ma et al.
2025/0138838 A1 5/2025 Ramesh et al.
2025/0139267 A1 5/2025 Zykh et al.
2025/0139382 A1 5/2025 Mohammed et al.
2025/0139708 A1 5/2025 Bouëtté et al.
2025/0147733 A1 5/2025 Abbas et al.
2025/0148321 A1 5/2025 Stanevich et al.
2025/0165375 A1 5/2025 Cresswell et al.
2025/0165866 A1 5/2025 Cresswell et al.
2025/0173170 A1 5/2025 Glynn-Udrow et al.
2025/0173568 A1 5/2025 Cresswell et al.
2025/0173618 A1 5/2025 Cresswell et al.
2025/0173619 A1 5/2025 Cresswell et al.
2025/0173725 A1 5/2025 Devarajan et al.
2025/0181321 A1 6/2025 Gormley
2025/0182028 A1 6/2025 Gormley
2025/0182196 A1 6/2025 Gormley
2025/0182222 A1 6/2025 Gormley
2025/0191062 A1 6/2025 Heglin et al.
2025/0217175 A1 7/2025 Karbasi et al.
2025/0225560 A1 7/2025 Bajaj et al.
2025/0231668 A1 7/2025 Tao et al.
2025/0231750 A1 7/2025 Lim et al.
2025/0231774 A1 7/2025 Tao et al.
2025/0231775 A1 7/2025 Tao et al.
2025/0231793 A1 7/2025 Lim et al.
2025/0232130 A1 7/2025 Tao et al.
2025/0232351 A1 7/2025 Tao et al.
2025/0232375 A1 7/2025 Tao et al.
2025/0232376 A1 7/2025 Tao et al.
2025/0232377 A1 7/2025 Tao et al.
2025/0232503 A1 7/2025 Lim et al.
2025/0238536 A1 7/2025 Nikoghossian et al.
2025/0245071 A1 7/2025 Ionescu et al.
2025/0245511 A1 7/2025 D'Agostino et al.

OTHER PUBLICATIONS

TensorFlow. Robust machine learning on streaming data using Kafka and Tensorflow-IO. Jan. 10, 2022. Retrieved from the Internet <URL:https://www.tensorflow.org/io/tutorials/kafka> (Year: 2022).*
Royal, Mike. Apache Kafka Guide. Oct. 10, 2021. Retrieved from the Internet <URL:https://github.com/mikeroyal/Apache-Kafka-Guide> (Year: 2021).*
Scott, Dylan, Gamov, Viktor, Klein, Dave. Kafka in Action. Manning Publications. Feb. 2022 (Year: 2022).*
Boschi, Sigismondo, Santomaggio, Gabriele. RabbitMQCookbook. Packt Publishing open source. Dec. 2013 (Year: 2013).*
Stovell, Paul. "Local vs. remote queues in pub/sub messaging [closed]", StackOverflow. Most recent answer Sep. 8, 2011. Retrieved from the Internet <URL: https://stackoverflow.com/questions/7340334/local-vs-remote-queues-in-pub-sub-messaging>. (Year: 2011).*
Chang et al., "Classifier Guided Cluster Density Reduction," U.S. Appl. No. 18/817,329, filed Aug. 28, 2024.
Cresswell et al., "Efficient Scaling of Artificial Intelligence Models," U.S. Appl. No. 18/934,321, filed Nov. 1, 2024.
Cresswell et al., "Scaling Artificial Intelligence Models With Gradient Boosting," U.S. Appl. No. 18/934,282, filed Nov. 1, 2024.
Gofman et al., "Recommendation Process for Retrieval-Augmented Generation (RAG) Models," U.S. Appl. No. 18/817,519, filed Aug. 28, 2024.
Meyer et al., "Automated Data Validation Recommendations to Enhance Reliability of Artificial Intelligence," U.S. Appl. No. 18/813,254, filed Aug. 23, 2024.
Meyer et al., "Enhancing Reliability of Artificial Intelligence Operational Pipelines," U.S. Appl. No. 18/813,238, filed Aug. 23, 2024.
Meyer et al., "Reducing Computation Time in Data Revalidation in Artificial Intelligence Operational Pipelines," U.S. Appl. No. 18/813,270, filed Aug. 23, 2024.
Meyer et al., "Tokenized Data Validation in Artificial Intelligence Operational Pipelines," U.S. Appl. No. 18/813,557, filed Aug. 23, 2024.
Starsyk et al., "Optimization of Processing Core Assignment for Software Using Runtime Attributes," U.S. Appl. No. 18/813,577, filed Aug. 23, 2024.
Starszyk et al., "Automated Component Deployment Recommendations for Artificial Intelligence Production Pipeline Orchestration," U.S. Appl. No. 18/817,285, filed Aug. 28, 2024.
Starszyk et al., "Automated Efficiency Determination of Components Prior to Deployment to Artificial Intelligence Production Pipeline," U.S. Appl. No. 18/817,290, filed Aug. 28, 2024.
Starszyk et al., "Dynamic Determination of Host Location for Logging System of Artificial Intelligence Pipelines," U.S. Appl. No. 18/813,626, filed Aug. 23, 2024.
Starszyk et al., "Optimizer for Processing Core Affinity," U.S. Appl. No. 18/813,594, filed Aug. 23, 2024.
Starszyk et al., "Recruitment of Software Program to Optimal Cores," U.S. Appl. No. 18/813,608, filed Aug. 23, 2024.
Thomas et al., "Context Retrieval for In-Context Learning Model," U.S. Appl. No. 18/817,408, filed Aug. 28, 2024.
Thomas et al., "Nearest Neighbor Retrieval and Fine-Tuning for In-Context Learning Model," U.S. Appl. No. 18/817,505, filed Aug. 28, 2024.
Thomas et al., "Tabular Selection Based on Dimensionality of Memory of Artificial Intelligence Model," U.S. Appl. No. 18/817,371, filed Aug. 28, 2024.
Thomas et al., "Weighted Retrieval for In-Context Tabular Model," U.S. Appl. No. 18/817,402, filed Aug. 28, 2024.
Heglin et al., "Auto-Adjudication Process via Machine Learning," U.S. Appl. No. 19/053,942, filed Feb. 14, 2025.

* cited by examiner

100B

100C

200B

200C

400B

400C

400D

500

600

610

710

FAULT TOLERANT LOGGING FOR ARTIFICIAL INTELLIGENCE APPLICATIONS

BACKGROUND

Real-time artificial intelligence (AI) applications, machine learning (ML) applications, and the like, can generate one or more log messages in response to a single request. In some cases, the log messages provide data for monitoring performance of the models and/or the applications, debugging issues that arise, training and/or retraining models, and the like. AI applications often rely on a central logging system for storing the log messages generated by the AI applications. When the central logging system is unavailable, log messages are often lost or otherwise not maintained.

SUMMARY

One example embodiment provides an apparatus that includes a memory and a processor coupled to the memory, wherein the processor may one or more of execute a worker on a server host, wherein the worker comprises a log messenger, an application programming interface (API), and at least one processing thread, execute a predictive pipeline with the at least one processing thread of the worker, wherein the predictive pipeline comprises an artificial intelligence (AI) model and at least one pipeline attribute, identify at least one load attribute of the server host, generate a logging system configured to receive log messages of the predictive pipeline from the log messenger and write the log messages to a log database, determine whether to deploy the logging system at the server host or at a remote host based on the at least one load attribute of the server host and the at least one pipeline attribute of the predictive pipeline, and deploy the logging system based on the determination of whether to deploy the logging system at the server host or the remote host.

Another example embodiment provides a method that includes one or more of executing a worker on a server host, wherein the worker comprises a log messenger, an application programming interface (API), and at least one processing thread, executing a predictive pipeline using the at least one processing thread of the worker, wherein the predictive pipeline comprises an artificial intelligence (AI) model and at least one pipeline attribute, identifying at least one load attribute of the server host, generating a logging system configured to receive log messages of the predictive pipeline from the log messenger and write the log messages to a log database, determining whether to deploy the logging system at the server host or at a remote host based on the at least one load attribute of the server host and the at least one pipeline attribute of the predictive pipeline, and deploying the logging system based on the determining of whether to deploy the logging system at the server host or the remote host.

A further example embodiment provides a computer readable storage medium comprising instructions, that when read by a processor, cause the processor to perform one or more of executing a worker on a server host, wherein the worker comprises a log messenger, an application programming interface (API), and at least one processing thread, executing a predictive pipeline using the at least one processing thread of the worker, wherein the predictive pipeline comprises an artificial intelligence (AI) model and at least one pipeline attribute, identifying at least one load attribute of the server host, generating a logging system configured to receive log messages of the predictive pipeline from the log messenger and write the log messages to a log database, determining whether to deploy the logging system at the server host or at a remote host based on the at least one load attribute of the server host and the at least one pipeline attribute of the predictive pipeline, and deploying the logging system based on the determining of whether to deploy the logging system at the server host or the remote host.

One example embodiment provides an apparatus that includes a memory and a processor coupled to the memory, wherein the processor may one or more of execute a worker on a server host, wherein the worker comprises a log messenger and at least one processing thread, execute a message broker on the server host, wherein the message broker is decoupled from the worker and comprises a queue, execute at least one artificial intelligence (AI) pipeline via the at least one processing thread of the worker, wherein the at least one AI pipeline is configured to generate log messages, transfer the log messages from the log messenger to the message broker, store the log messages within the queue of the message broker, determine, by the message broker, that a log message from among the log messages has reached an end of the queue, and in response to a determination that the log message has reached the end of the queue, write, by the message broker, the log message to a log database.

Another example embodiment provides a method that includes one or more of executing a worker on a server host, wherein the worker comprises a log messenger and at least one processing thread, executing a message broker on the server host, wherein the message broker is decoupled from the worker and comprises a queue, executing at least one artificial intelligence (AI) pipeline via the at least one processing thread of the worker, wherein the at least one AI pipeline is configured to generate log messages, transferring the log messages from the log messenger to the message broker, storing the log messages within the queue of the message broker, determining, by the message broker, that a log message from among the log messages has reached an end of the queue, and in response to a determination that the log message has reached the end of the queue, writing, by the message broker, the log message to a log database.

A further example embodiment provides a computer readable storage medium comprising instructions, that when read by a processor, cause the processor to perform one or more of executing a worker on a server host, wherein the worker comprises a log messenger and at least one processing thread, executing a message broker on the server host, wherein the message broker is decoupled from the worker and comprises a queue, executing at least one artificial intelligence (AI) pipeline via the at least one processing thread of the worker, wherein the at least one AI pipeline is configured to generate log messages, transferring the log messages from the log messenger to the message broker, storing the log messages within the queue of the message broker, determining, by the message broker, that a log message from among the log messages has reached an end of the queue, and in response to a determination that the log message has reached the end of the queue, writing, by the message broker, the log message to a log database.

DETAILED DESCRIPTION

Figure 1A:
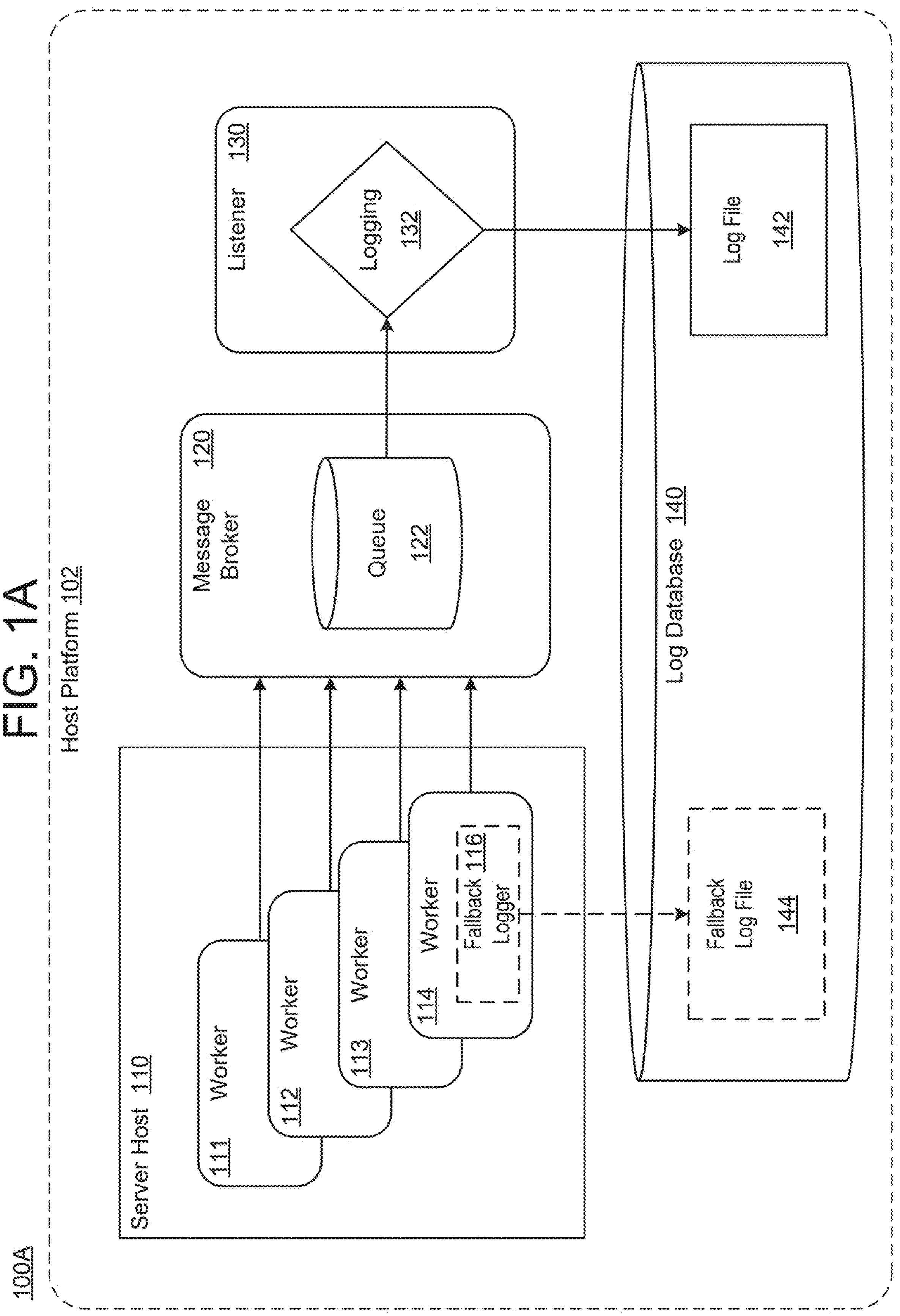
FIGS. 1A-1C are diagrams illustrating a fault tolerant logging system for AI applications according to examples and features of the instant solution.

Real-time artificial intelligence (AI) applications may generate many log messages in response to a request, some of which become artifacts that a business retains for monitoring, explainability, audits, etc. The AI applications often use a central log system for storing log messages. However, there are situations which can cause a central log system to stop logging or otherwise be unavailable including network error (for remote systems), software errors, debugging, power outage, and the like. In situations where the central logging system is unavailable, log messages have no way of being retained.

The examples and features of the instant solution overcome the above-described drawbacks in the art by implementing a fault-tolerant logging system for capturing all of these messages while maintaining a low response time for the client. One of the technical benefits of the fault-tolerant logging system is that it can retain logging messages (and subsequently store the log messages) when a log database is down or otherwise unavailable. Another technical benefit of the fault-tolerant logging system is that it can be hosted in different locations including a remote location from the AI application and a local location (e.g., within a same cluster, etc.) as the AI application. The decision on whether to deploy the logging system at the remote location or the local location can be made dynamically based on factors such as load on the local system, attributes of the AI application/pipeline, and the like.

The fault-tolerant logging system may be referred to as a light weight, two level logging system. The system is light weight because it may be implemented with built-in software libraries, making it easier to debug and maintain. The system may include an asynchronous logger that is configured to receive log messages from one or more AI applications (running on one or more workers of a host server). Here, each worker may contain an independent messenger object inside its memory space. Whenever a message is logged inside a worker, the messenger first tries to send it to a message broker.

The message broker may be loosely coupled to the workers and is able to listen to predefined ports on a localhost (such as a worker) which makes the message communication very fast (~0.3 milliseconds). The message broker also includes a temporary storage structure such as a queue where log messages can be stored until written to a log database. A listener process may listen to the message broker and may perform logging to a log file within the log database. For example, the listener process may detect a log message (or group of messages) generated by an AI application which have reached the end of the queue and write the log message(s) to the log database.

Regardless of how many log messages are generated inside a worker, the writing of the log message(s) may be done by a background process, therefore not interfering with the worker's processing time of a request. In addition, regardless of how many log messages a worker generates during a request, the writing of all of these messages may be offloaded to a background process (i.e., the listener process) which is loosely coupled to the message broker. An additional technical benefit can be achieved through the decoupled structure. For example, by offloading the writing to the log database to a different process, the worker is not blocked by the disk writes and can continue processing the request immediately after passing the message, therefore minimizing response time. Furthermore, all worker messages may be received by a single listener process, without having to perform write synchronization. Furthermore, because the server, the broker, and the listener are loosely coupled, the loss in connectivity with one of these components will not cause a direct impact to the others.

In addition, the logging system may include a fallback logger that is integrated into each worker process. When the worker (e.g., a log messenger therein, etc.) attempts to send a log message to the message broker but the log message fails, the worker may transfer the log message to a fallback logger which each worker has running in its memory space. The fallback logger will write logs to the log database (e.g., a fallback file, etc.) until the message broker is working again. Because the fallback logger is integrated into the worker, the disk writes are now initiated by the worker process which may add latency to the response time. However, the log messages are still captured and stored in a fault-tolerant manner ensuring that all log messages are captured and stored.

Traditional logging mechanisms within AI environments often rely on centralized logging systems, which pose a substantial risk of log data loss in scenarios where the central logging system becomes unavailable due to network issues, hardware failures, or other disruptions. This vulnerability is exacerbated in high-demand, real-time AI applications that generate vast amounts of log data, necessitating an uninterrupted and reliable logging solution.

The instant solution addresses this challenge by introducing a dynamic, fault-tolerant logging system that significantly enhances the resilience and efficiency of log data management in computer systems. The instant solution incorporates a novel approach to dynamically determine the optimal host location for the logging system—whether local or remote—based on real-time load attributes of the server host and attributes of the AI pipeline. This dynamic determination reduces the computational burden on a single system by intelligently distributing logging tasks across available resources, optimizing system resources' use, and ensuring that log data is reliably captured and stored.

The instant solution enhances the fault tolerance of the logging process using a decoupled message broker and an integrated fallback logger. The message broker operates independently of the worker processes, ensuring that log messages are queued and managed efficiently without impeding the primary functions of the AI pipeline. In the event of a message broker failure, the fallback logger within the worker seamlessly takes over the logging duties, storing log messages locally until the message broker is restored. This redundancy ensures that no log data is lost, even in the presence of system failures, thereby improving the overall reliability and robustness of the computer system.

Implementing asynchronous logging processes reduces the latency associated with logging operations. By offloading the task of writing log messages to a background process, the instant solution minimizes the impact on the worker's processing time, enabling the AI pipeline to continue executing tasks without interruption.

Figure 1B:
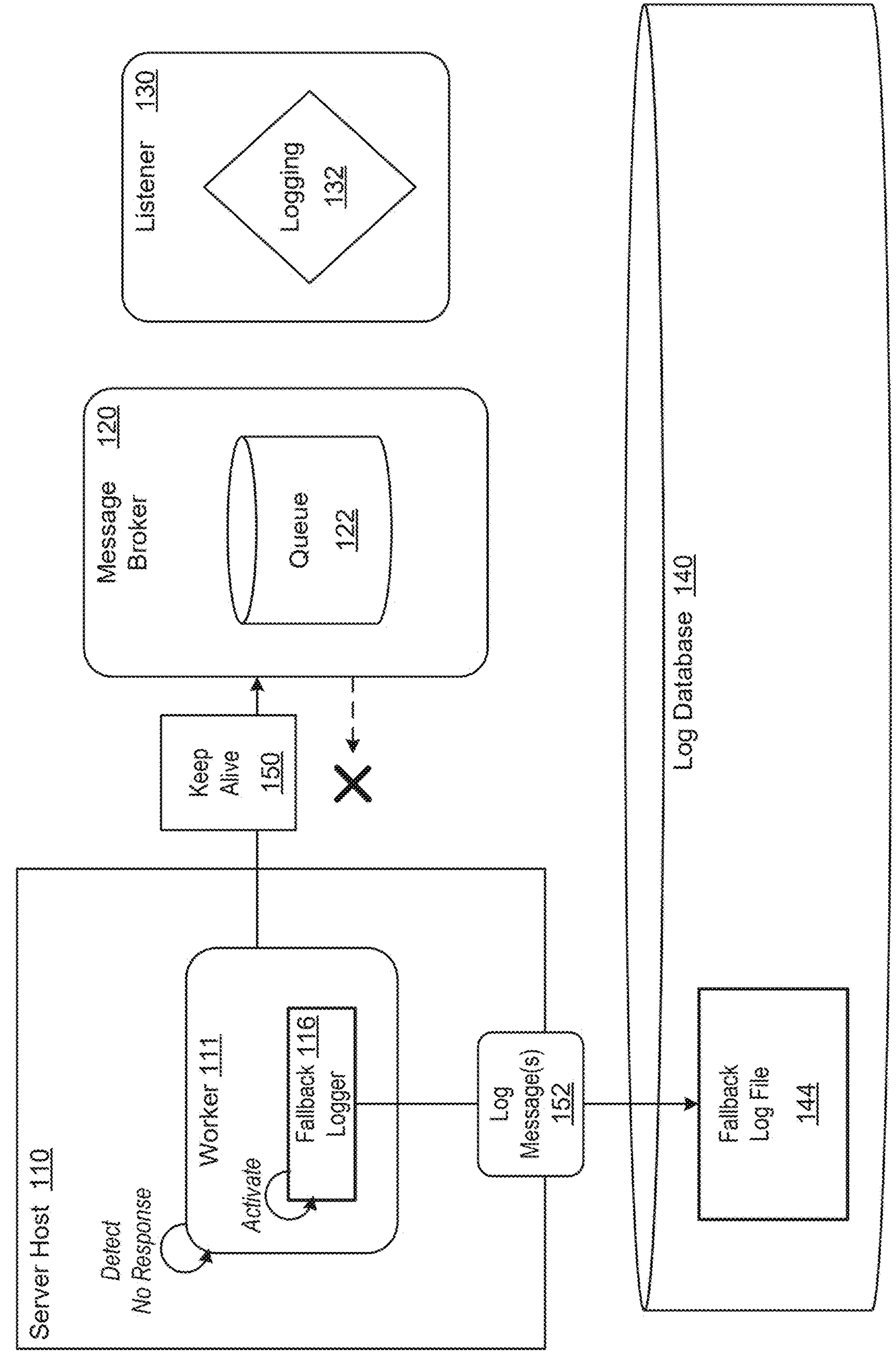
Figure 1C:
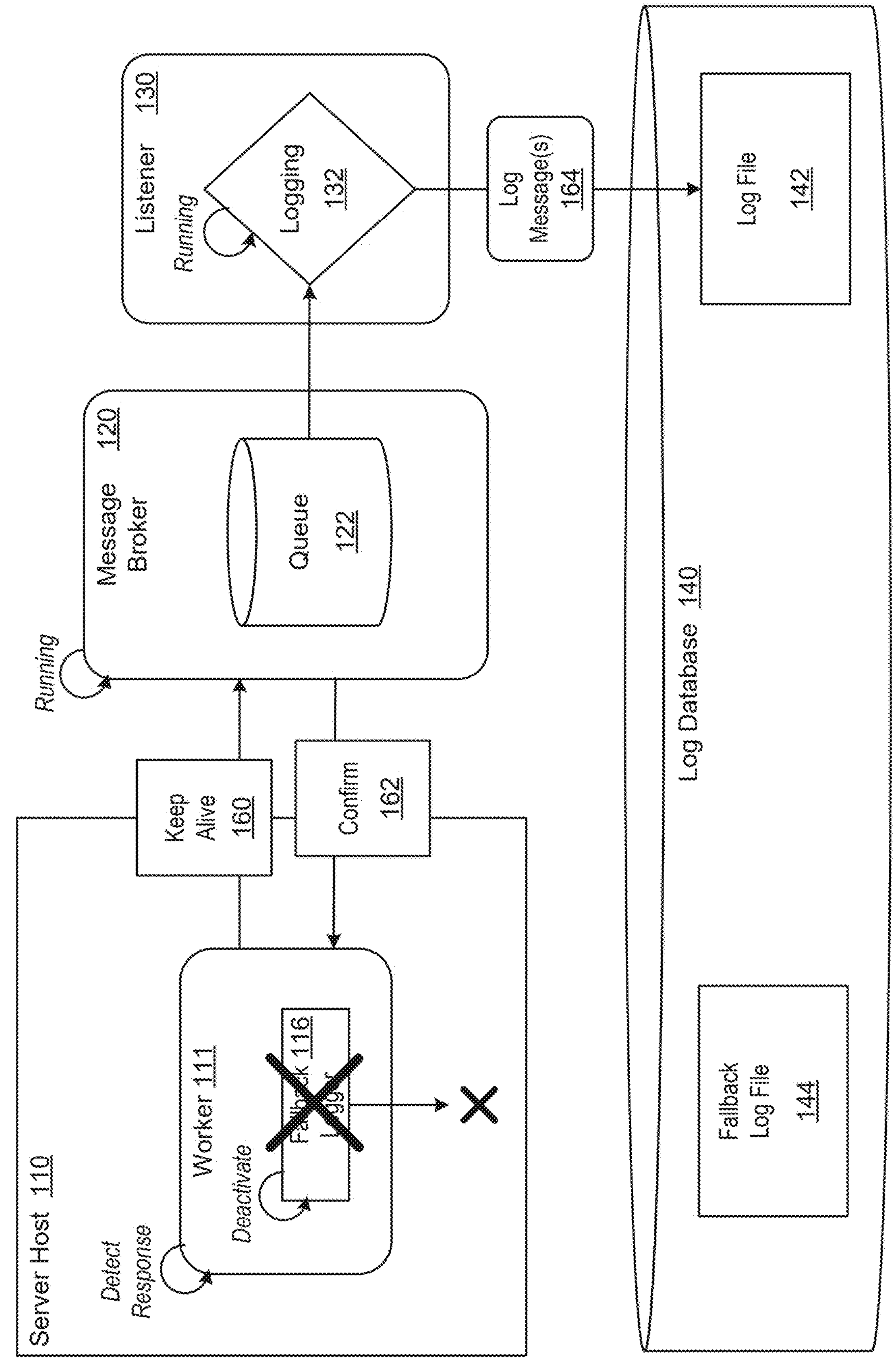

FIGS. 1A-1C illustrate a fault tolerant logging system for AI applications according to examples and features of the instant solution. According to various examples and features of the instant solution, the fault-tolerant logging system may include a message broker, a listener, and a fallback logger. The message broker and the listener may be combined into a logging module that is hosted locally by the same server host where the worker is being used to run a software application. As another example, the message broker and the listener may be hosted on a remote system, such as a remote server that connects to the server host where the worker is running using a network connection. Meanwhile, the fallback logger may be integrated within the worker on the server host.

FIG. 1A illustrates a process 100A of a fault-tolerant logging system according to examples and features of the instant solution. Referring to FIG. 1A, a host platform 102, such as a cloud platform, a web server, a combination of servers/systems, and the like, may host a server host 110 such as a cluster, etc. The server host 110 includes a plurality of workers 111, 112, 113, and 114 which are configured to execute predictive pipelines that include AI models, ML models, AI applications, ML applications, and the like. For example, the predictive pipelines may be utilized for generating predictions (inferences) using input data. As another example, the predictive pipelines may be utilized for training a model. Each worker among the plurality of workers 111, 112, 113, and 114 may execute/run source code and perform one or more tasks of a software application.

According to various examples and features of the instant solution, the host platform 102 may also host a fault-tolerant logging system that includes a message broker 120, a listener 130, and a log database 140. The fault-tolerant logging system may also include a fallback logger 116 that is integrated/stored within a memory space of one or more of the workers from among the plurality of workers 111, 112, 113, and 114. In this example, the plurality of workers 111, 112, 113, and 114 may generate log messages based on execution thereof and may send the log messages to the message broker 120.

Here, the message broker 120 may store each of the log messages within a queue 122 of the message broker. The log messages may be stored in the queue 122 in an order in which they arrive at the message broker 120.

The listener 130 may listen to a predefined port of the message broker 120 and may receive log messages from the message broker 120. Here, the message broker may take the log message (or group of log messages) at the top of the queue 122 and transfer the log message(s) to the listener 130. The listener 130 may include a logging module 132 which receives the log message(s) from the message broker 120 and writes the log message(s) to a log file 142 within the log database 140. This logging process may continue until the message broker 120 is no longer available for some reason.

Meanwhile, when the message broker 120 becomes unavailable, for example, when the message broker 120 is powered off, is corrupted, is being updated, etc., a worker may bypass the message broker 120 and send the log messages directly to the log database 140. For example, each worker may include the fallback logger 116 installed and running in its memory space. The fallback logger 116 may write the log messages directly from the AI application being run by the worker into a fallback log file 144 within the log database 140. This process may continue until the message broker 120 subsequently becomes available, at which point, the fallback logger 116 may be stopped, and the message broker 120 in combination with the listener 130 may be used to write the log messages to the log database 140.

FIG. 1B illustrates a process 100B of detecting that the message broker 120 is unavailable and activating the fallback logger 116 according to examples and features of the instant solution. Referring to FIG. 1B, a worker 111 may execute one or more tasks of a software application that includes one or more AI model, model pipelines, or the like. During execution, the one or more tasks may generate log messages 152. Initially, the worker 111 (e.g., a log messenger installed in the worker 111) may determine how to send the log messages 152 to the log database 140. For example, the worker 111 may determine whether to send the log messages 152 to the message broker 120 or to use the fallback logger 116.

In this example, the worker 111 may transmit keep-alive messages 150 to the message broker 120 which request responses from the message broker 120. When the message broker 120 responds with a confirmation, the worker 111 detects that the message broker 120 is available and sends the log messages to the message broker 120.

However, when the worker 111 does not receive a response from the message broker 120, the worker 111 may determine that the message broker 120 is not available. The worker 111 may wait for a predetermined amount of time (e.g., 500 milliseconds, 2 seconds, 5 seconds, 10 seconds, 20 seconds, 1 minute, etc.). When no response is received during the predetermined amount of time, the worker 111 may determine the message broker 120 is unavailable. Here, the worker 111 may activate the fallback logger 116 in its memory space and send the log messages 152 to the log database 140 via the fallback logger 116.

FIG. 1C illustrates a process 100C of detecting that the message broker 120 is available and deactivating the fallback logger 116 according to examples and features of the instant solution. Referring to FIG. 1C, the worker 111 may continue to transmit keep alive messages 160 to the message broker 120 while the fallback logger 116 is operating. Here, the worker 111 may receive a response to confirm 162 from the keep alive messages 160 and may determine that the message broker 120 has resumed availability. In response, the worker 111 may deactivate the fallback logger 116 and resume use of the message broker 120 for writing to the log database 140. As another example, keep alive messages may not be used. Instead, an API to the message broker 120 may be installed within the worker 111 and may automatically transfer messages to the message broker 120 when the message broker 120 is available. In a situation where the message broker 120 is not available, the API may respond to the worker 111 with a notification that the message broker 120 is not available. Other examples are also possible.

In this example, the worker 111 generates log messages 164 based on tasks performed for an AI application and sends the log messages 164 to the message broker 120. In response, the message broker 120 may store the log messages 164 in the queue 122 until the log messages 164 reach an end of the queue 122. Then, the message broker 120 may transfer the log messages 164 to the listener 130 which writes the log messages 164 to the log database 140 using the logging module 132.

The AI application described herein may include one or more AI models, ML models, and the like. Examples of AI models include a neural network such as a large language model (LLM), which is a type of ML model, other branches of AI, such as, but not limited to, computer vision, fuzzy logic, expert systems, deep learning, generative AI, and natural language processing, may be employed in developing the AI model in this instant solution. Further, the AI model included in these examples and features of the instant solution is not limited to particular AI algorithms. Any algorithm or combination of algorithms related to supervised, unsupervised, and reinforcement learning may be employed.

The AI models, ML models, neural networks, and other branches of AI, described and/or depicted herein, build upon the fundamentals of predecessor technologies and form the foundation for all future technological advancements in artificial intelligence. An AI classification system describes the stages of AI progression and advancement. The first classification is known as "reactive machines," followed by present-day AI classification "limited memory machines" (also known as "artificial narrow intelligence"), then progressing to "theory of mind" (also known as "artificial general intelligence") and reaching the AI classification "self-aware" (also known as "artificial superintelligence"). Present-day limited memory machines are a growing group of AI models built upon the foundation of their predecessors, reactive machines. Reactive machines emulate human responses to stimuli; however, they are limited in their capabilities as they cannot typically learn from prior experience. Once the AI model's learning abilities emerged, its classification was promoted to limited memory machines. In this present-day classification, AI models learn from large volumes of data, detect patterns, solve problems, generate, and predict data, and the like, while inheriting all the capabilities of reactive machines.

Examples of AI models classified as limited memory machines include, but are not limited to, chatbots, virtual assistants, machine learning, neural networks, deep learning, natural language processing, generative AI models such as LLMs, and any future AI models that are yet to be developed possessing characteristics of limited memory machines.

For example, a neural network is a type of machine learning model that relies on training data to learn associations and connections, improving its accuracy for performing high speed data classifications, clustering, and other analyses of data. Such neural network capabilities are the foundation of deep learning models today as well as becoming the foundational blocks of those yet to be developed.

For example, generative AI models combine limited memory machine technologies, incorporating machine learning and deep learning, forming the foundational building blocks of future AI models. For example, theory of mind is the next progression of AI that may be able to perceive, connect, and react by generating appropriate reactions in response to an entity with which the AI model is interacting; all these theory of mind capabilities relies on the fundamentals of generative AI. Furthermore, in an evolution into the self-aware classification, AI models will be able to understand and evoke emotions in the entities they interact with, as well as possessing their own emotions, beliefs, and needs, all of which rely on generative AI fundamentals of learning from experiences to generate and draw conclusions about itself and its surroundings.

AI models may include, but are not limited to, at least one machine learning model, neural network model, deep learning model, generative AI model, or any combination of models from the branches of AI. AI models are integral and core to future artificial intelligence models. As described herein, AI model refers to present-day AI models and future AI models.

Figure 2A:
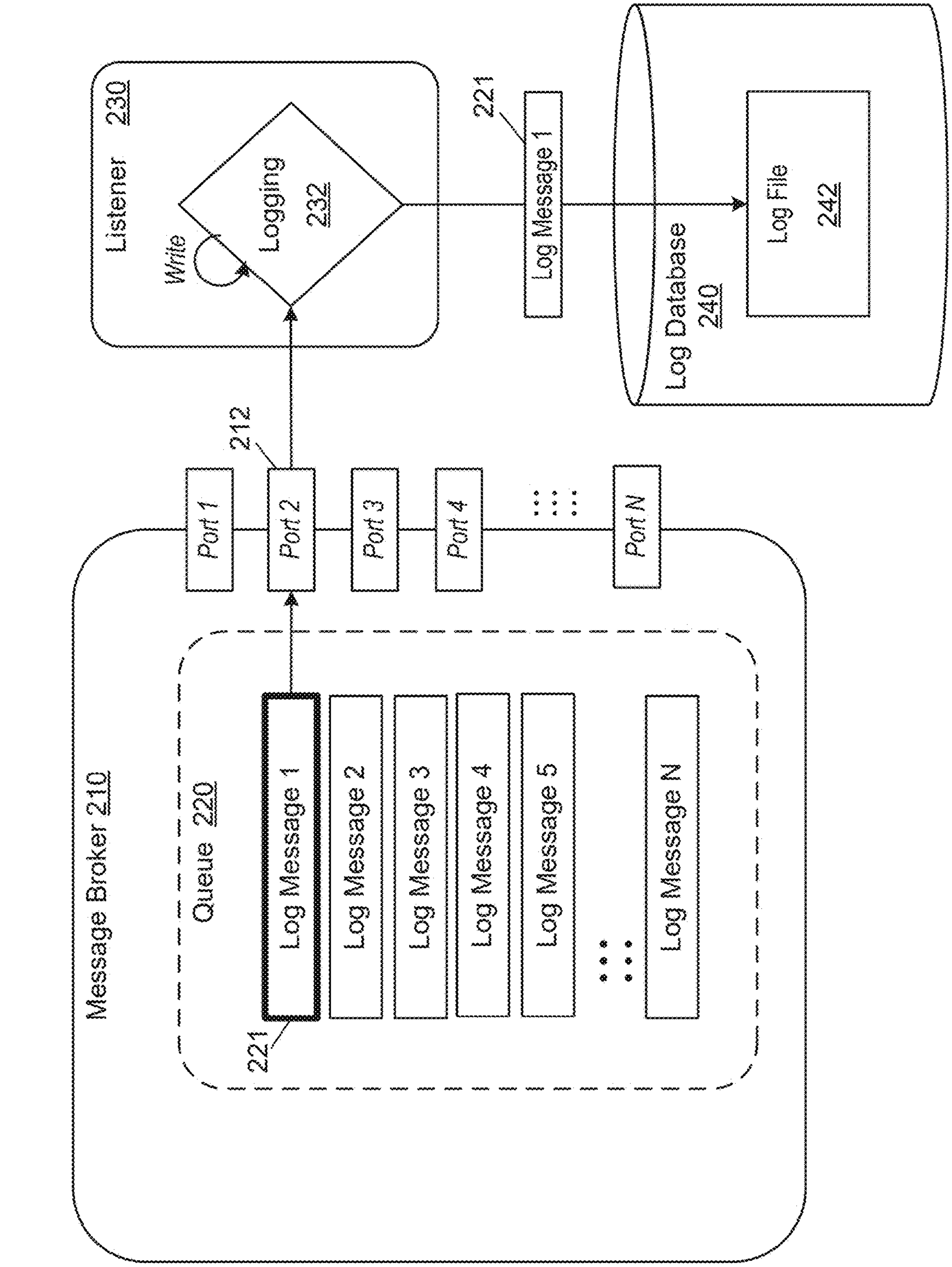
FIGS. 2A-2C are diagrams illustrating a process of a message broker according to the examples and features of the instant solution.
Figure 2B:
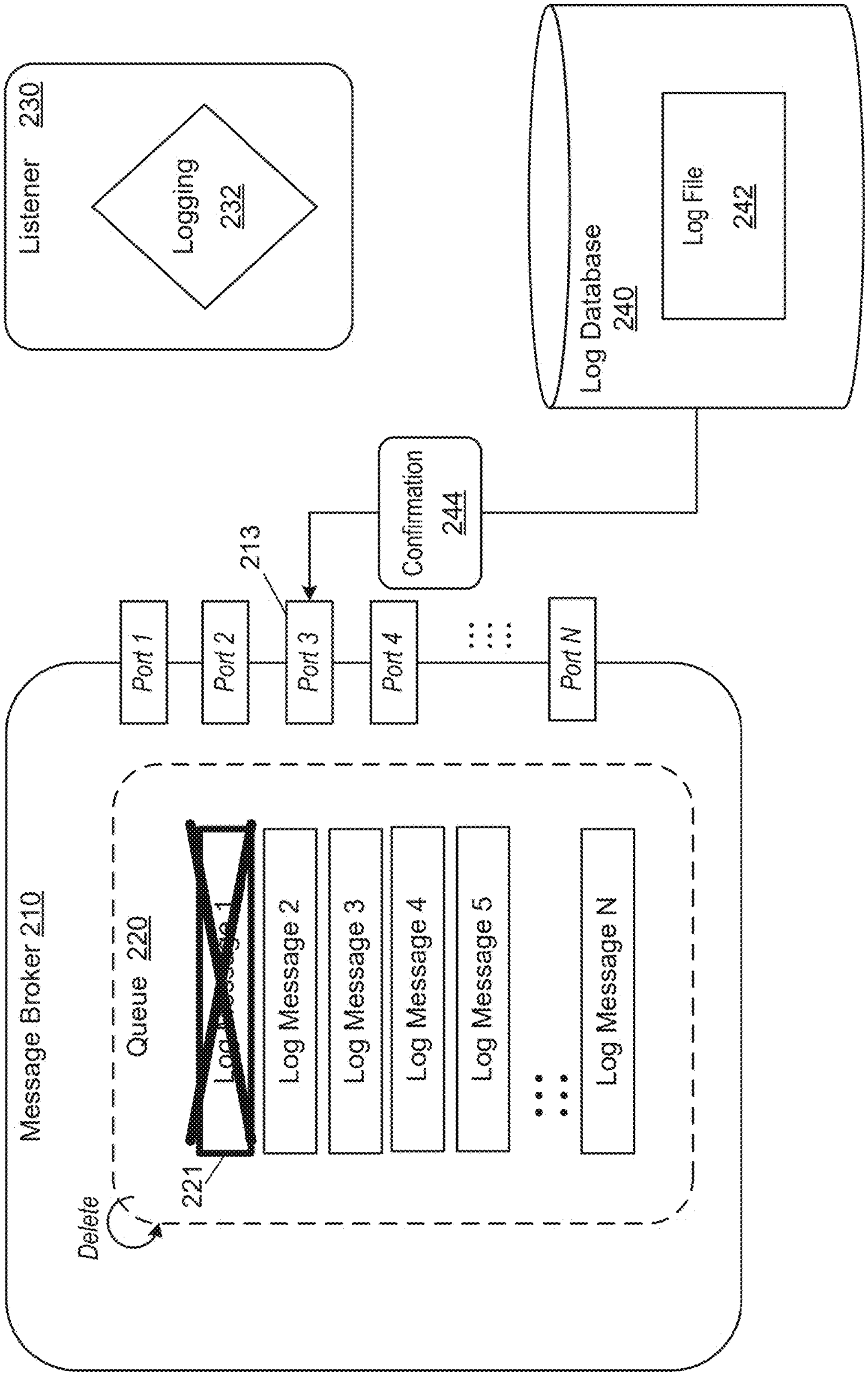
Figure 2C:
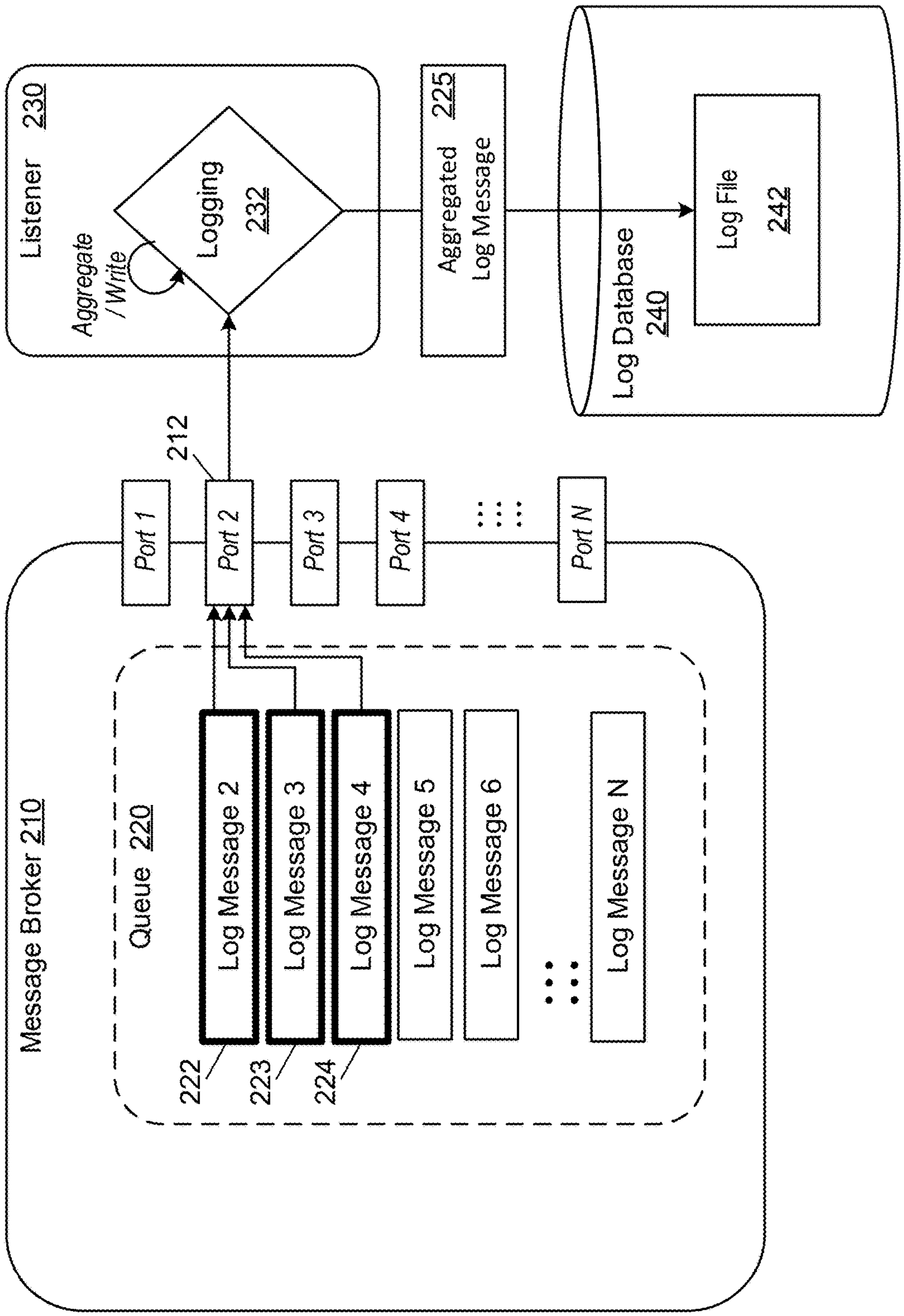

FIGS. 2A-2C illustrate a process of a message broker 210 managing a queue 220 according to the examples and features of the instant solution. In these examples, the message broker 210 may correspond to the message broker 120 that is shown and described with respect to FIGS. 1A-1C. FIG. 2A illustrates a process 200A of transferring a log message 221 to a listener 230 according to examples and features of the instant solution. Referring to FIG. 2A, log messages from one or more workers (not shown) running on a server host are received by the message broker 210 and stored within the queue 220 in an order in which they are received. As log messages reach an end of the queue 220 (e.g., a top of the queue, etc.), the log messages are sent to the listener 230 via a predefined network port 212.

In this example, the listener 230 is listening to the predefined network port 212 and detects the log messages that are published to the predefined network port 212. In the example of FIG. 2A, the log message 221 is sent to the predefined network port 212 and captured by the listener 230. In response, a logging module 232 of the listener 230 writes the log message 221 to a log file 242 in a log database 240. This process may be repeated each time a new log message reaches the end of the queue 220. By queuing the log messages before writing the log messages to the log database 240, the message broker 210 ensures that all log messages will be written to the log database 240 even when the transfer rate to the message broker 210 is faster/greater than the transfer rate from the message broker 210 to the listener 230.

FIG. 2B illustrates a process 200B of deleting the log message 221 from the queue 220 according to examples and features of the instant solution. Referring to FIG. 2B, after transferring the log message 221 to the listener 230, the message broker 210 may continue to keep a copy of the log message 221 in the queue 220. Here, the message broker 210 may not delete the log message 221 from the queue until an express confirmation of the log message being written to the log database 240 is received.

In this example, the log database 240 may receive a write instruction from the logging module 232 of the listener 230 and write the log message 221 to the log file 242 within the log database 240. After writing the log message 221 into the log file 242, the log database 240 may transmit a confirmation message 244 to the message broker 210, for example, a predefined network port 213 of the message broker 210. The confirmation message 244 may identify the log message 221 (e.g., by name, timestamp, details, etc.). In response to receiving the confirmation message 244, the message broker 210 may delete the log message 221 from the queue 220 and cause the remaining log messages within the queue 220 to move towards an end of the queue 220.

FIG. 2C illustrates a process 200C of transferring a plurality of log messages 222, 223, and 224 to the listener 230 at the same time (simultaneously) according to examples and features of the instant solution. In this example, the plurality of log messages 222, 223, and 224 are simultaneously written to the log file 242. Referring to FIG. 2C, the plurality of log messages 222, 223, and 224 may be extracted from the end of the queue 220 (e.g., a top of the queue, etc.), and the plurality of log messages 222, 223, and 224 are aggregated together into an aggregated log message 225 and sent to the listener 230 via the predefined network port 212. In other words, rather than send a single log message as in the example of FIG. 2A, in the example of FIG. 2C, multiple log messages are simultaneously extracted from the queue 220 and sent to the listener 230.

In this example, the listener 230 is listening to the predefined network port 212 and detects the plurality of log messages 222, 223, and 224 which are published to the predefined network port 212. In response, the logging module 232 of the listener 230 may aggregate the plurality of log messages 222, 223, and 224 into a single aggregated message, and write the aggregated message to the log file 242 in the log database 240.

This process may be repeated each time a batch of log messages reaches the end of the queue 220.

Figure 3A:
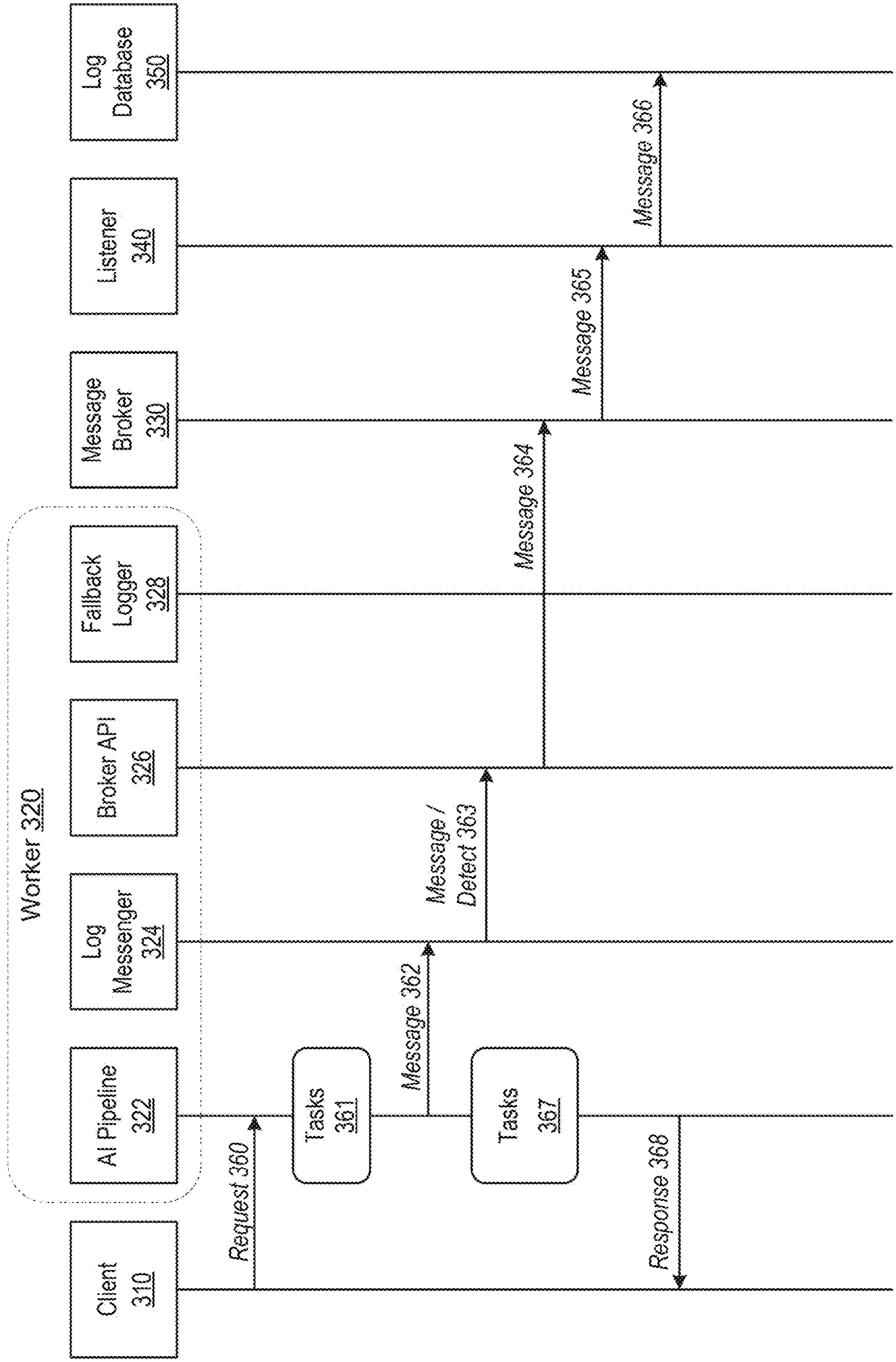
FIG. 3A is a diagram illustrating a process of logging when a message broker is available according to examples and features of the instant solution.
Figure 3B:
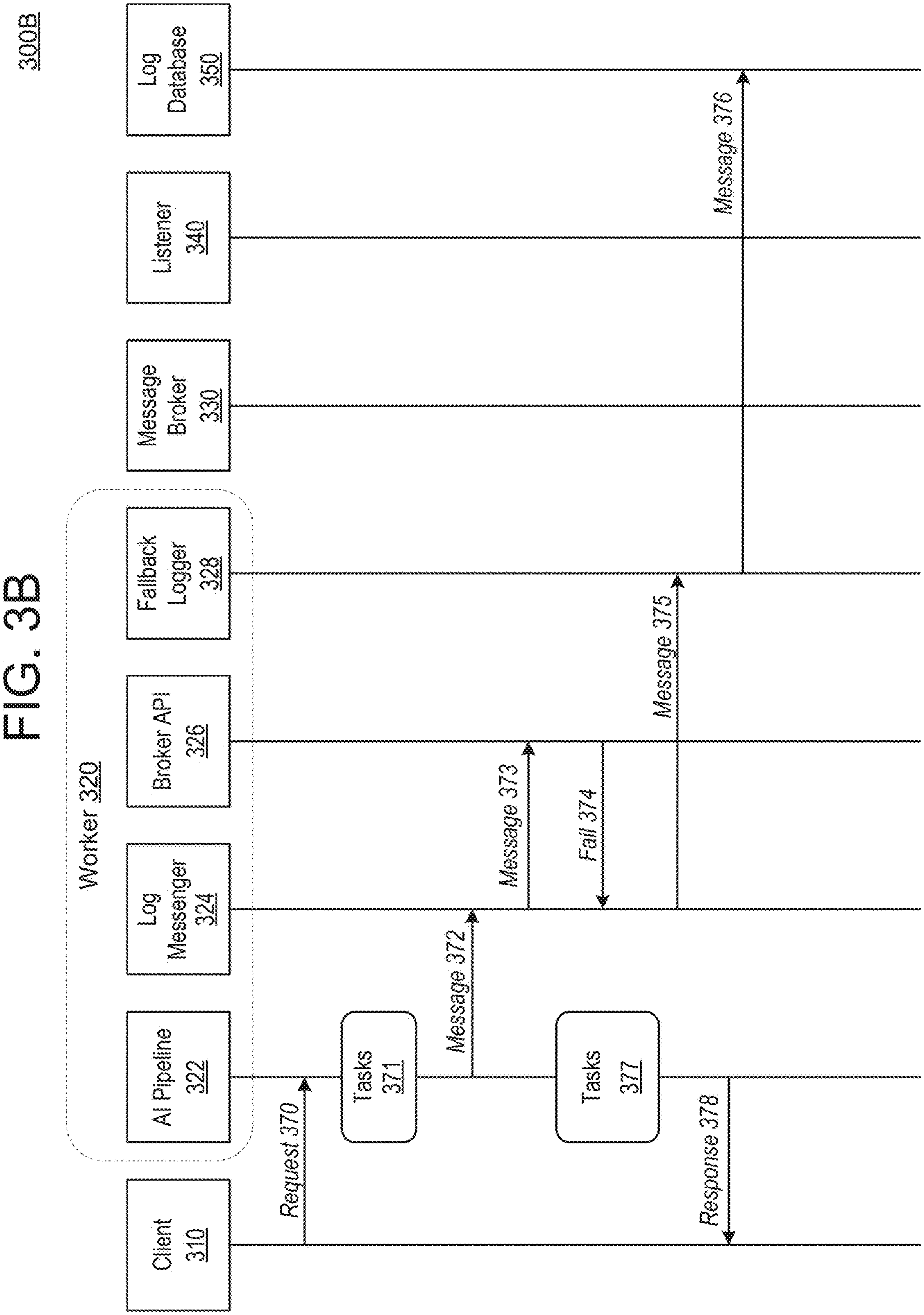
FIG. 3B is a diagram illustrating a process of logging when a message broker is not available according to examples and features of the instant solution.

FIG. 3A illustrates a process 300A of logging when a message broker is available according to examples and features of the instant solution, and FIG. 3B illustrates a process 300B of logging when a message broker is not available according to examples and features of the instant solution. In the examples of FIGS. 3A and 3B, a client 310 interacts with a software application which is executed (at least in part) by a worker 320 that is in communication with a logging system that includes a message broker 330, a listener 340, and a log database 350. The message broker 330 may be similar to the message broker 120, the listener 340 may be similar to the listener 130, and the log database 350 may be similar to the log database 140, which are shown and described in the examples of FIGS. 1A-1C. According to various examples and features of the instant solution, the worker 320 may include/execute an AI pipeline 322, a log messenger 324, a broker API 326, and a fallback logger 328.

Referring to FIG. 3A, the client 310 may submit a request 360 to execute the AI pipeline 322 via the worker 320. In response, the AI pipeline 322 may execute tasks 361 which generate log messages. In message 362, the AI pipeline 322 may forward a log message to the log messenger 324. In response, in message/detect 363, the log messenger 324 may detect that the message broker 330 is available by sending the message to the broker API 326. The message may expect a response from the broker API 326, or it may not. For example, the broker API 326 may respond when the message broker 330 is not available. When it is determined that the message broker is available, the broker API 326 will successfully receive the log message in 363 and transfer the log message to the message broker 330, in message 364.

In response, the message broker 330 may queue the log message. When the log message reaches an end of the queue, the message broker 330 may transfer the log message to the listener 340 in message 365. In response, in message 366, the listener 340 may write the log message to the log database 350. The AI pipeline 322 may generate multiple log messages that are processed in the same manner as described in the example of FIG. 3A, in response to a single request submitted from the client 310. Furthermore, the AI pipeline 322 may continue to perform tasks 367 until an end of the tasks 367 are reached. In response 368, the worker 320 (via the AI pipeline 322) may transmit a notification to the client 310 indicating the request has completed.

Referring now to FIG. 3B, similar to the example in FIG. 3A, the client 310 may submit a request 370 to execute the AI pipeline 322. In this example, the AI pipeline may be executed and may perform tasks 371 as part of the pipeline. During the performance of the tasks, a log message may be generated. In message 372, the AI pipeline 322 may transfer the log message to the log messenger 324. In message 373, the log messenger 324 may transfer the log message to the broker API 326. In this example, unlike in the example of FIG. 3A, the message broker 330 associated with the broker API 326 is not available. In response, the broker API 326 may notify the log messenger 324 that the message broker is unavailable in fail 374.

In response to determining that the message broker 330 is not available, the log messenger 324 may transfer the log message to the fallback logger 328 in message 375. Here, the fallback logger 328 is hosted locally within the worker 320 (e.g., in a memory space of the worker 320). In message 376, the fallback logger 328 may transfer the log message to the log database. Furthermore, the AI pipeline 322 may continue to perform tasks 377 until an end of the tasks 377 are reached. In response 378, the worker 320 (via the AI pipeline 322) may transmit a notification to the client 310 indicating the request has completed.

Figure 4A:
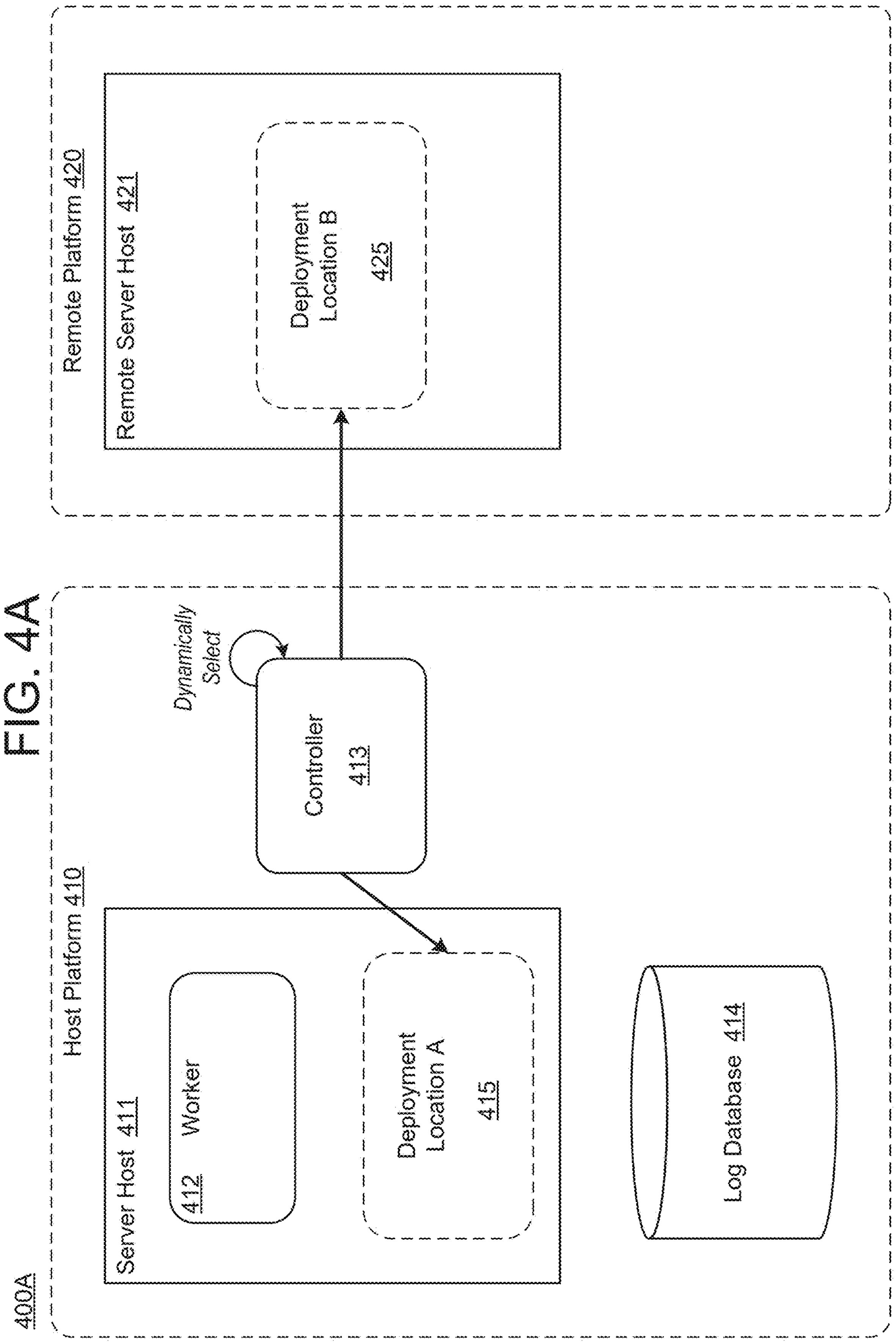
FIGS. 4A-4D are diagrams illustrating a process of dynamically determining a host location for a logging system according to examples and features of the instant solution.

FIGS. 4A-4D illustrate a process of dynamically determining a host location for a logging system according to examples and features of the instant solution. For example, FIG. 4A illustrates a process 400A of dynamically determining whether to host a logging system at a deployment location 415 on a server host 411 locally running on a host platform 410 or at a deployment location 425 at a remote server host 421 running on a remote platform 420 according to examples and features of the instant solution. Referring to FIG. 4A, a host platform 410 may host the server host 411. In this case, the server host 411 may execute one or more applications via a worker 412 that runs on the server host 411. According to various examples and features of the instant solution, a fault-tolerant logging system may be added to the worker 412 enabling log messages generated by the applications being executed via the worker 412 to be stored within a log database 414 on the host platform 410.

In this example, the host platform 410 may include a controller 413 which receives a request to deploy a software application (such as an AI-based application), and initiates/deploys the worker 412 for executing tasks of the software application. In addition, the controller 413 may also generate and deploy a logging system such as the logging system 430 shown in the examples of FIGS. 4C and 4D. Here, the controller 413 may dynamically determine whether to host the logging system at the server host 411 or at the remote server host 421. The decision may be based upon load attributes of the server host 411 and/or the remote server host 421. In some examples and features of the instant solution, the decision may also or instead be based on attributes of the AI application/AI pipeline being executed by the worker 412.

Here, the host platform 410 may correspond to a cloud platform, web server, or the like, which is remote from (e.g., connected over a computer network) to the remote platform 420. Similar to the host platform 410, the remote platform 420 may be a web server, cloud platform, or the like. In these examples the host platform 410 includes the server host 411 in a local runtime environment thereof while the remote platform 420 includes a remote server host 421 which is remote to the local runtime environment of the host platform 410.

Figure 4B:
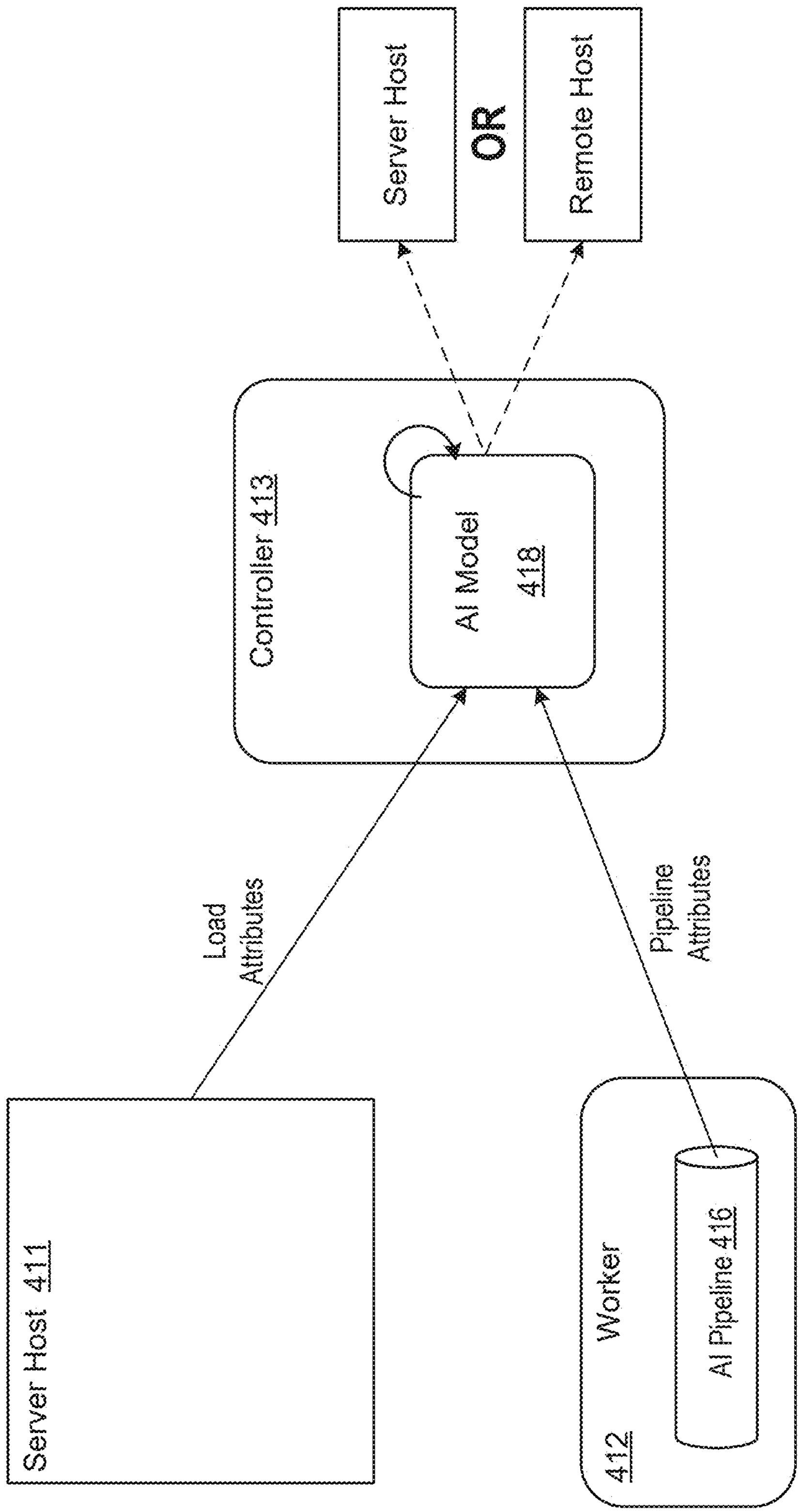

FIG. 4B illustrates a process 400B of determining whether to host the logging system at the server host 411 on the host platform 410 or the remote server host 421 on the remote platform 420 according to examples and features of the instant solution.

Referring to FIG. 4B, the controller 413 may include an AI model 418 which is configured to determine the optimal location for hosting the logging system based on one or more of load attributes of the server host 411, load attributes of the remote server host 421, pipeline attributes of an AI pipeline 416 being executed by the worker 412, and the like.

In this example, the load attributes may include current availability of the processing cores at the server host 411 (and/or the remote server host 421). The current availability may represent a current speed of each of the processing cores, a processing load on each of the processing cores, a number of processing cores that are starved, a number of instructions performed per second, or the like. Meanwhile, the pipeline attributes may include type of AI model, type of processing being performed (e.g., batch versus single execution, etc.), period of time the pipeline is expected to execute, and the like. The load attributes and the pipeline attributes may be captured from sensors at the server host 411.

The AI model 418 may be trained to identify an optimal host location of the logging system based on previous/historical load data of the server host 411, attributes of AI pipelines executed by the server host 411 when generating the historical load data over time, peak load times at the server host 411, logging system performance at the server host 411 and/or the remote server host 421, and the like. Here, the load attributes and/or the pipeline attributes may be provided to the controller 413 and input to the AI model 418 which predicts the optimal location for hosting the logging system based on its training. Upon determining the optimal location, the controller 413 may deploy the logging system at the optimal location.

Figure 4C:
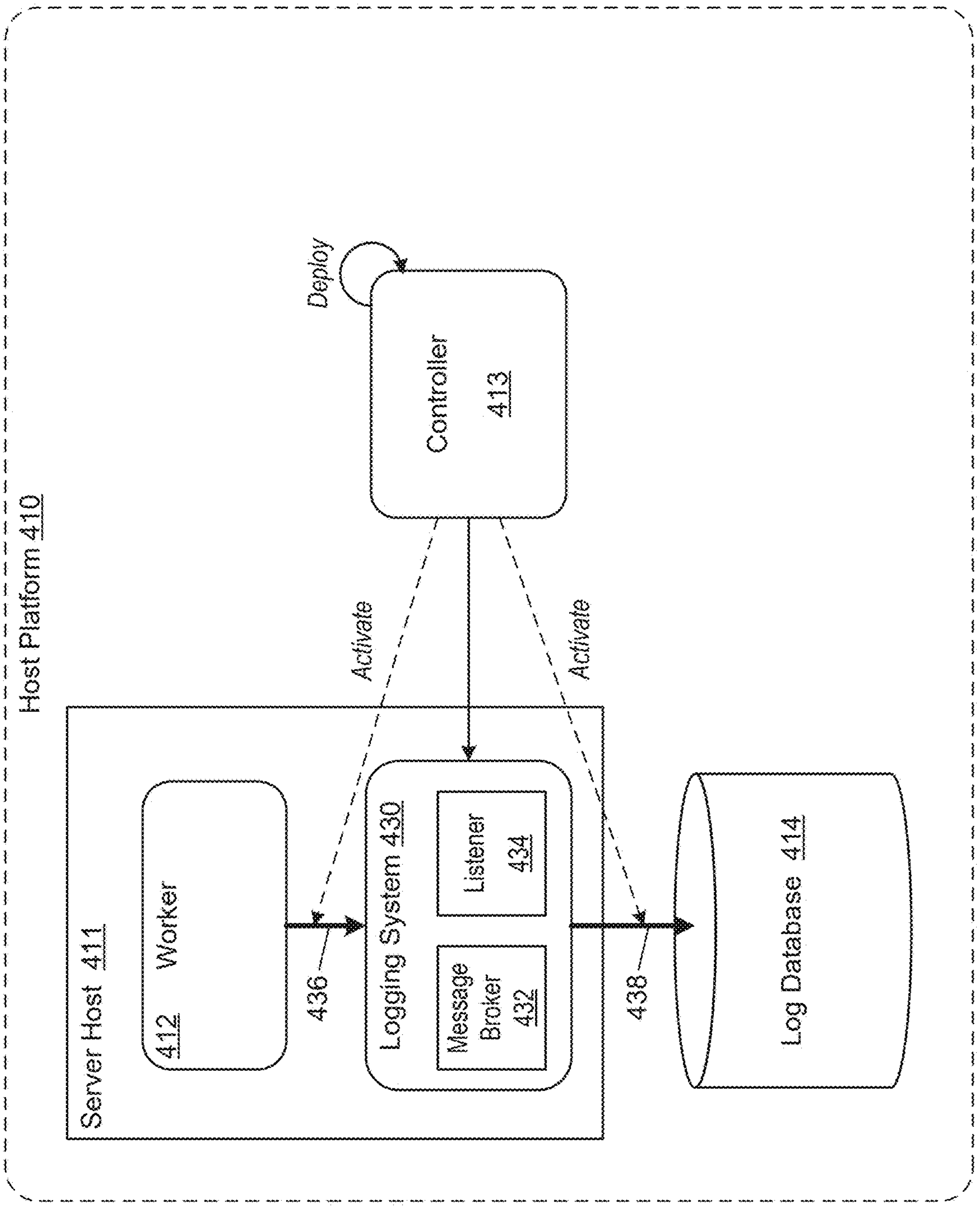

FIG. 4C illustrates a process 400C of deploying the logging system 430 at the server host 411 that is local to the worker 412 where the AI pipeline 416 is being executed according to examples and features of the instant solution. Referring to FIG. 4C, the controller 413 may generate the logging system 430 including a message broker 432 (similar to the message broker 120 shown in FIG. 1A) and a listener 434 (similar to the listener 130 shown in FIG. 1A) and initialize the logging system 430 within a runtime environment of the server host 411.

In addition, the controller 413 may dynamically establish a communication channel 436 (local channel) between the worker 412 and the logging system 430 (e.g., the message broker 432). To do this, the controller 413 may establish an API connection (local connection) between a log messenger module of the worker 412 and the message broker 432 within a same pod on the host platform 410. Furthermore, the controller 413 may dynamically establish a communication channel 438 (local channel) between the logging system 430 and the log database 414. In the example of FIG. 4C, an additional communication channel (not shown) may also be established between the worker 412 (e.g., the fallback logger) to the log database 414.

The server host 411 may be located within a pod or cluster of a server. Accordingly, the local communication channels may be securely and quickly established by the controller 413. In addition, when the worker 412 executes the AI pipeline 416, log messages generated by the AI pipeline 416 may be provided to the log database 414 through the communication channels 436 and 438, and via the logging system 430.

Figure 4D:
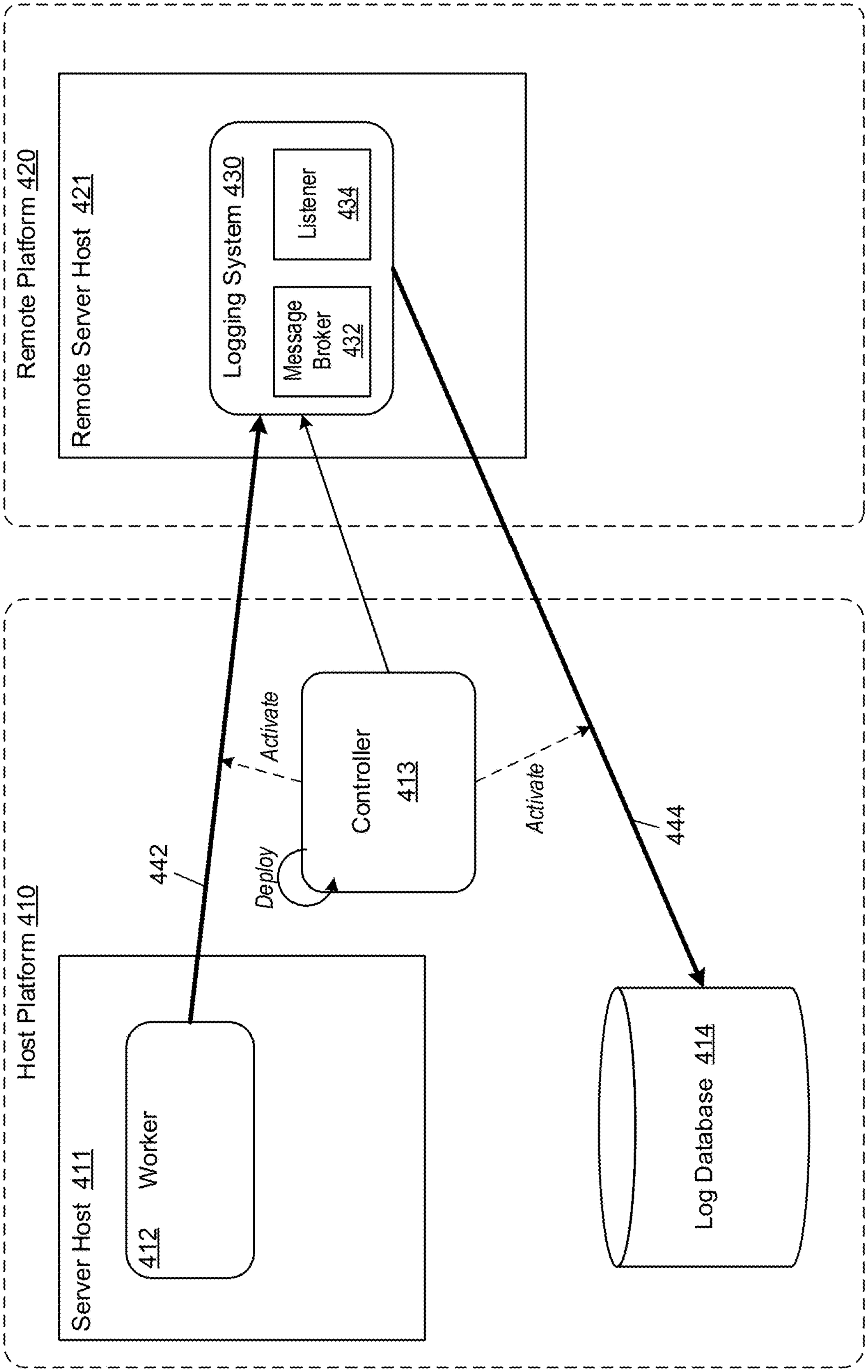

FIG. 4D illustrates a process 400D of deploying the logging system 430 at the remote server host 421 that is network-connected to the host platform 410 where the worker 412 and the AI pipeline 416 are being executed according to examples and features of the instant solution. Referring to FIG. 4C, the controller 413 may generate the logging system 430 and deploy the logging system 430 within a runtime environment of the remote server host 421. The controller 413 may generate a network communication channel 442 between the worker 412 at the server host 411 and the logging system 430 on the remote server host 421. The controller 413 may also generate a network communication channel 444 between the logging system 430 running on the remote server host 421 and the log database 414 on the server host 411.

In this example, the worker 412 may execute the AI pipeline 416 which results in log messages being generated. Rather than the log messages being sent to a local logging system, in this example, the log messages are sent to the logging system 430 on the remote server host 421 via the network communication channel 442. Likewise, the log messages may be queued by the message broker 432 and written to the log database 414 by the listener 434. In this case, the listener 434 may write the log messages to the log database 414 over the network communication channel 444.

In some situations, using the remote server host 421 to host the logging system 430 may result in faster logging being performed enabling the system to run more efficiently. The AI model 418 (shown in FIG. 4B) may determine when such situation exists based on its training.

In another example of the instant solution, upon receiving a request to execute a predictive pipeline, which includes AI model 418, the server host processes this request through the worker 412. As the AI pipeline 416 performs its tasks, it generates log events for monitoring, debugging, and auditing purposes. These log events are handled by the log messenger. The message broker 432, also running on the server host, is configured to receive and aggregate these log events from the log messenger and write them to a storage system, such as a log database 414. Concurrently, a software fallback logger runs on the server host, ready to store log events in memory or on local storage when the message broker 432 becomes unavailable.

The instant solution includes a mechanism for determining the availability of the message broker 432. The log messenger regularly checks the broker's availability by sending keep-alive messages via a broker API. When the broker responds, it is deemed available, and the log messenger sends the log events to the broker, which then aggregates these events and writes them to the log database. When the broker does not respond, indicating it is not running, the log messenger reroutes the log events to the software fallback logger. The fallback logger stores these events until the broker becomes available again.

Once the message broker 432 is back online, the fallback logger sends the stored log events to the broker, ensuring that no log data is lost during the broker's downtime. This transition between the message broker 432 and the fallback logger ensures continuous logging of events and fault tolerance. The components are initialized on the server host, receiving and processing a request to execute an AI model, generating and handling log events, checking the broker's availability, and finally, switching to the fallback logger when the broker is unavailable. This method ensures that log events are stored and managed, providing a reliable logging system for AI pipelines.

In another example of the instant solution, the worker 412 is executed on the server, initializing the log messenger within its memory. As the worker 412 performs its tasks, it generates at least one log message, which is stored in the memory. The log messenger then sends this log message to the decoupled message broker through a specific port. The message broker receives the log message and stores it in its queue, which may also contain log messages from another worker 412 executing on the server. The message broker continuously monitors the queue to determine when a log message reaches the end. Upon this determination, the message broker writes the log message to the log database for permanent storage.

For example, when the server starts a process that includes data processing tasks, the worker 412 logs events such as "task started," "processing data," and "task completed" within its memory. The log messenger transmits the log message "task completed" to the message broker via a TCP/IP port. The message broker's queue accumulates log messages such as "Worker1: task completed" and "Worker2: data saved." The message broker identifies that "Worker1: task completed" is now at the front of the queue and ready for processing. Consequently, the message broker writes "Worker1: task completed" to the log database for permanent storage.

The instant solution ensures that log messages generated by worker 412 are effectively transmitted, queued, and stored, providing a reliable logging mechanism that decouples the worker 412 from the log storage operations, enhancing system robustness and fault tolerance.

Figure 5:
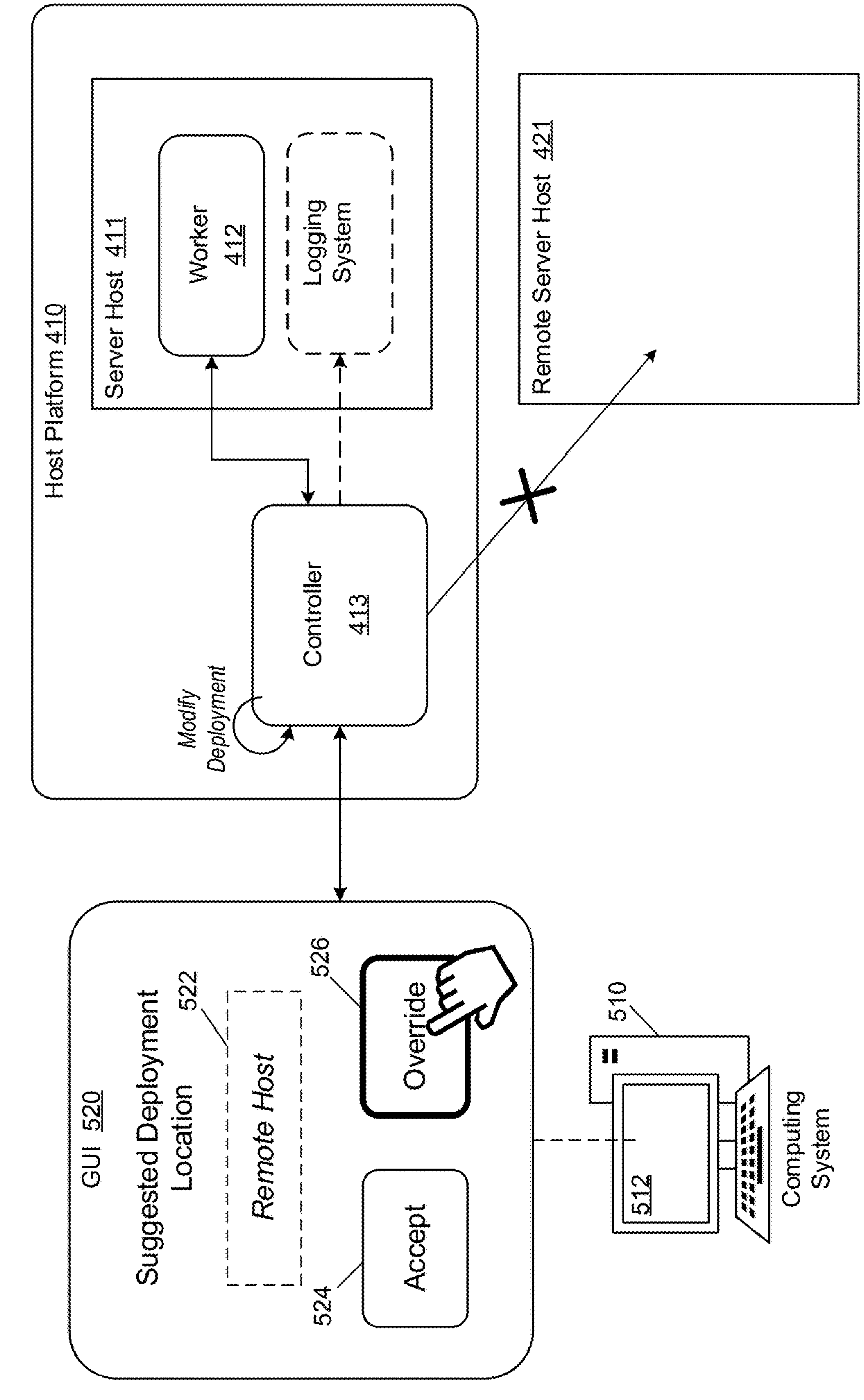
FIG. 5 is a diagram illustrating a process of overriding a host deployment location based on a graphical user interface (GUI) according to examples and features of the instant solution.

FIG. 5 illustrates a process 500 of overriding a host deployment location based on inputs submitted via a GUI 520 according to examples and features of the instant solution. Referring to FIG. 5, the controller 413 (shown in FIGS. 4A-4D) may also provide a GUI 520 which enables a user/viewer to accept or override the suggested deployment location of the logging system. For example, the user may use a computing terminal 510 with a display screen 512 to connect to the controller 413/host platform and view the GUI 520. In this example, the user may access the AI pipeline running on the worker 412 through the controller 413. The GUI 520 may provide options for inputting commands to trigger execution of the AI pipeline and for modifying the components within the AI pipeline.

In addition, upon receiving instructions/request to launch the AI pipeline, the controller 413 may determine an optimal deployment location for a logging system associated with the AI pipeline. In this case, the controller 413 determines the optimal location is the remote server host 421 (shown in FIGS. 4A-4D). The controller 413 displays an identifier 522 of the optimal host location on the GUI 520 along with an input mechanism 524 and an input mechanism 526 which enable a user to accept the optimal host location or override the optimal host location. In this case, the user presses the input mechanism 526 which overrides the suggested deployment location of the remote server host 421. In response, the controller 413 may instead deploy the logging system at the server host 411 that is local to the worker 412.

The instant solution comprises a memory and a processor coupled to the memory, with the processor configured to execute a worker on a server host, where the worker includes a log messenger, an API, and at least one processing thread. The worker is responsible for executing a predictive pipeline, which encompasses an AI model and at least one pipeline attribute. The processor's role extends to identifying at least one load attribute of the server host, an aspect that informs the deployment strategy of the logging system. The logging system receives log messages from the predictive pipeline via the log messenger and writes these messages to a log database. The processor determines whether to deploy the logging system locally on the server host or remotely based on the identified load attribute of the server host and the pipeline attribute of the predictive pipeline. The processor deploys the logging system at the determined location, ensuring that log messages are adequately captured and stored, regardless of the solution's state or external conditions. The fault-tolerant logging system includes a message broker, a listener, and a fallback logger. The message broker operates as a queue, storing log messages temporarily until they can be written to the log database and ensuring that log messages are not lost even when the logging system is temporarily unavailable. The listener component actively listens for log messages from the message broker and writes them to the log database. In situations where the message broker is not available, the fallback logger integrated within the worker captures and stores the log messages directly, maintaining data integrity and continuity.

The instant solution deploys the logging system at the server host based on the load attribute of the server host and the pipeline attribute of the predictive pipeline. The processor identifies load attributes of the server host, which may include factors such as processor usage, memory availability, and current solution load. These attributes are used in determining the feasibility and efficiency of hosting the logging system locally. Once these attributes are identified, the processor generates a logging system that is configured to receive log messages from the log messenger and write them to a log database. The logging system includes components such as a message broker and a listener. The message broker acts as a temporary storage mechanism, queuing log messages received from the worker and ensuring that these messages are available for subsequent processing even when immediate storage in the log database is not possible. The listener receives the log messages from the message broker and writes them to the log database. The two-step process ensures that all log messages are captured and stored in a structured manner, facilitating easy retrieval and analysis. The processor deploys the logging system at the server host based on a favorable assessment of the load attributes and the pipeline attributes, indicating that the server host has sufficient resources to handle both the execution of the predictive pipeline and the operations of the logging system. Once deployed, the logging system operates through local connections, ensuring low-latency communication between the worker and the logging system components. The log messenger sends log messages to the message broker through an API, and the message broker then queues these messages before the listener writes them to the log database. By keeping the logging operations within the same server host, the solution minimizes potential points of log loss and optimizes performance. The fallback logger, integrated within the worker, serves as a backup mechanism, ensuring that log messages are still captured and stored locally, even when the message broker or the listener encounters issues.

The instant solution is configured to deploy the logging system at a remote host. The processor identifies at least one load attribute of the server host, such as processor utilization, memory availability, and network bandwidth. These attributes, along with the characteristics of the predictive pipeline, inform the processor's decision on whether to deploy the logging system locally or remotely. In scenarios where the load attributes indicate that the server host may be under significant load or may not have adequate resources to support both the pipeline execution and logging operations, the processor may opt to deploy the logging system at a remote host. The logging system, once deployed at the remote host, includes components such as a message broker and a listener. The message broker serves as an intermediary, receiving log messages from the log messenger and queuing them for processing. The listener, positioned at the remote host, accesses these messages from the message broker and writes them to a log database. The process ensures that all log messages are captured and stored efficiently, even when the logging system is not co-located with the AI pipeline execution. The processor establishes a network connection between the server host, where the worker resides, and the remote host, where the logging system is deployed. The log messenger within the worker sends log messages via the established network connection to the message broker at the remote location. The connection may be implemented using secure protocols to ensure data integrity and confidentiality during transmission. The use of a remote logging system may also involve considerations for network latency and bandwidth, which the solution can manage by batching log messages or prioritizing logs. Deploying the logging system remotely offers several benefits, including offloading the server host's processing and storage burdens, thus increasing overall performance. It also provides a fail-safe mechanism, as the remote deployment can continue to capture and store logs even when the server host encounters issues.

The instant solution is configured to establish a network connection between the log messenger of the worker at the server host and the remote host, where the logging system is deployed. The solution identifies load attributes of the server host, which may include metrics such as processor usage, memory consumption, and network bandwidth availability. Based on these attributes and the specific requirements of the predictive pipeline, the processor determines whether to deploy the logging system locally or at a remote host. In cases where it is advantageous to offload the logging tasks to a separate system, the processor opts to deploy the logging system remotely. Once the decision to deploy remotely is made, the solution establishes a network connection between the server host and the remote host, enabling the log messenger within the worker to communicate with the logging system components, specifically the message broker, located at the remote host. The log messenger captures log messages generated by the predictive pipeline and sends these messages over the established network connection.

The network connection can be established using various networking technologies and protocols, ensuring secure and reliable communication. This may involve the use of virtual private networks (VPNs), secure sockets layer (SSL) encryption, or other security measures to protect the integrity and confidentiality of the transmitted data. The network setup is designed to support high throughput and low latency, allowing for efficient transmission of log messages even under high load conditions. At the remote host, the logging system includes a message broker and a listener. The message broker receives log messages from the log messenger via the network connection and queues them for processing. The listener then accesses these messages from the message broker and writes them to a log database. The remote logging architecture ensures that log messages are captured and stored even when the server host experiences issues or lacks sufficient resources for logging tasks.

The establishment of the network connection includes the configuration of appropriate communication channels and protocols. The log messenger utilizes the API to send log messages to the message broker at the remote host, which is equipped to handle incoming messages from potentially multiple server hosts. The solution includes mechanisms for monitoring the network connection's status and performance, ensuring that any issues can be promptly addressed to maintain the reliability of the logging process.

The instant solution is configured to handle requests for executing a predictive pipeline and to display deployment location information for the logging system through a GUI. The pipeline involves an AI model and at least one pipeline attribute, such as model type, input data, or computational requirements. The solution manages requests for executing the predictive pipeline, which may come from users or other systems. Upon receiving such a request, the processor evaluates the current load attributes of the server host—such as processor utilization, memory availability, and network bandwidth—alongside the pipeline attributes. The evaluation determines whether the logging system is to be deployed locally on the server host or at a remote host. The solution includes a GUI component accessible to users through a computing terminal. The GUI is integrated with the host platform and provides a user-friendly interface for interacting with the solution. It displays information, including the suggested deployment location for the logging system. When a request to execute the predictive pipeline is received, the GUI displays an identifier of the determined deployment location. The identifier might indicate whether the logging system will be hosted locally or remotely, depending on the solution's analysis of the load and pipeline attributes. In addition to displaying the information, the GUI allows users to interact with the solution and make adjustments. For instance, the GUI can present options for users to either accept the suggested deployment location or override it. This capability is used for scenarios where users might have specific preferences or requirements for the deployment location that differ from the solution's automated decision. The GUI provides input mechanisms, such as buttons or dropdown menus, enabling users to submit their choice. Upon user input via the GUI, the solution processes the request. When the user chooses to override the suggested location, the solution adjusts the deployment accordingly. For instance, when the solution suggests deploying the logging system remotely due to high server load, but the user prefers a local deployment for specific reasons, the solution can reconfigure itself to deploy the logging system locally. The processor then initiates the deployment process based on the final decision, ensuring that the logging system is set up at the appropriate location and is fully operational. The GUI's design and functionality provide transparency and control over the solution's operations, particularly concerning the deployment of the logging system. It informs users of the solution's internal decisions and also allows for user intervention, ensuring that the deployment aligns with both system optimization and user requirements.

The instant solution is configured to receive a request via a GUI to override the suggested deployment location of the logging system and subsequently deploy the solution based on the override. The solution evaluates the load attributes of the server host, such as processor load, memory usage, and network bandwidth, to determine the optimal location for deploying the logging system. The logging system, capturing and storing log messages generated by the predictive pipeline, can be deployed either locally on the server host or remotely on another system. The decision-making process considers both the load attributes and the pipeline attributes to optimize system performance and reliability. The GUI interacts with the host platform, allowing users to monitor and manage various aspects of the solution, including the deployment of the logging system. When a decision is made regarding the deployment location—either local or remote—the solution presents the suggested location on the GUI, providing an identifier for the user to see. The GUI includes an input mechanism that allows users to override the solution's suggested deployment location. The mechanism may include interactive elements like buttons, checkboxes, or dropdown menus, enabling users to select an alternative deployment option. For instance, when the solution recommends deploying the logging system at a remote host due to a high load on the local server, but the user prefers local deployment for faster access or compliance reasons, they can indicate this preference through the GUI.

Upon receiving an override request via the GUI, the solution processes the input and adjusts the deployment accordingly. The processor initiates the steps to implement the user-selected deployment. When the user chooses to override a remote deployment in favor of a local one, the solution reconfigures to set up the logging system on the local server host. This involves establishing local communication channels between the worker and the logging system components, such as the message broker and listener. Conversely, when the override request specifies remote deployment, the solution ensures that the logging system is set up on the remote host, with secure network connections established for transmitting log messages.

The instant solution is configured to respond to a command to override the server host as the deployment location for the logging system and instead opt for deployment at a remote host. The solution evaluates the server host's load attributes, including processor utilization, memory availability, and network capacity. These attributes, along with the characteristics of the predictive pipeline, inform the solution's automated recommendation for the logging system's deployment location, either at the server host or a remote host. This recommendation aims to optimize performance, reliability, and resource utilization. The solution includes a GUI that provides users with visibility into the system's operations and decision-making processes. The GUI displays the recommended deployment location based on the solution's analysis. However, recognizing the potential for manual intervention, the solution is designed to accommodate user commands to override the suggested deployment. When a user decides to override the recommended deployment location, preferring a remote host instead of the server host, they can issue this command through the GUI. The GUI includes interactive elements, such as buttons or dropdown menus, allowing the user to select the remote deployment option. The user input is processed by the solution, prompting the processor to initiate the reconfiguration of the logging system's deployment. Upon receiving the command to override the local deployment in favor of a remote setup, the solution establishes a network connection between the log messenger of the worker and the logging system components at the remote host. This involves configuring secure communication channels to ensure data integrity and confidentiality during the transmission of log messages. The remote logging system typically includes a message broker and a listener, responsible for queuing log messages and writing them to a log database, respectively. The message broker at the remote host acts as an intermediary, receiving log messages from the log messenger via the established network connection. These messages are queued in the broker, ensuring orderly processing. The listener then accesses these messages and records them in the log database, which may also be located at the remote host or another secure location. Deploying the logging system remotely can provide several benefits, such as offloading the server host's resource burden, enhancing system resilience, and potentially offering more specialized logging infrastructure. The solution's flexibility in handling override commands ensures that specific user requirements or operational considerations can be accommodated, even when they differ from the automated recommendation.

In one example, the instant solution includes a hybrid logging system where both local and remote logging components are utilized simultaneously. The system includes a memory and processor configured to execute workers on both a server host and a remote host. The workers, each containing a log messenger and processing threads, execute predictive pipelines with AI models. The solution dynamically distributes log messages between local and remote logging systems based on real-time load attributes, such as processor usage and network latency. The message broker at the local host handles low-latency, high-frequency logging tasks, while the remote message broker processes larger, less time-sensitive log batches, ensuring optimal resource utilization and minimizing the risk of log data loss.

In another example, the instant solution prioritizes data integrity and fault tolerance by implementing a redundant logging architecture. The solution's memory and processor are coupled to both a local and a remote logging system. The local logging system includes a message broker and a fallback logger, ensuring immediate log message capture even when the network connection to the remote system fails. Concurrently, the remote logging system also captures log messages through a synchronized network connection. This dual logging approach provides redundancy, ensuring that even when one logging system is unavailable, the other continues to record the log data, thereby providing a robust solution for the AI applications.

In another example, the instant solution integrates an AI model that analyzes historical and real-time load attributes to optimize the deployment of the logging system. The processor, executing a worker with an embedded AI module, predicts load scenarios based on past data patterns and current system state. The predictive model determines the optimal deployment location for the logging system, whether local or remote and dynamically adjusts as system conditions change. This AI-driven approach allows the solution to preemptively shift logging loads, enhancing performance and preventing bottlenecks, making it suitable for applications with highly variable workloads.

In another example, the instant solution emphasizes user control and customization through an advanced GUI. The solution includes a memory and processor that interface with a sophisticated GUI, allowing users to view detailed metrics of system load attributes and predictive pipeline attributes. Users can manually adjust logging configurations, such as selecting specific logging levels or choosing between local and remote deployment based on operational needs. The GUI also offers visualization tools, such as real-time graphs and historical data trends, providing users with insights into solution performance and helping them make informed decisions about logging system adjustments.

The instant solution comprises a memory and a processor configured to perform specific functions related to a logging system for AI pipelines. The solution includes a memory and a processor coupled to the memory. The processor is designed to execute a worker on a server host. The worker comprises a log messenger and at least one processing thread. The log messenger serves as an intermediary for log messages generated by the AI pipeline, facilitating the transfer of these messages to other components in the solution. The processing thread(s) within the worker executes one or more AI pipelines, which can include various types of AI models, such as neural networks, machine learning models, or other algorithms designed to perform specific tasks like predictions or data analysis. The processor executes a message broker on the server host. The message broker is decoupled from the worker, meaning it operates independently and can manage communication between different solution components. The message broker includes a queue, which temporarily stores log messages received from the log messenger. This decoupling and queuing mechanism are used for maintaining solution efficiency and reliability, as they allow the worker to continue processing without waiting for log messages to be written to a database.

The message broker's queue logs the solution's fault tolerance. When a log message reaches the end of the queue, the message broker determines the event and subsequently writes the log message to a log database. This functionality ensures that all log messages are eventually stored, even when the system encounters temporary issues such as network delays or database unavailability. The solution also includes the execution of a fallback logger on the server host. The fallback logger operates in situations where the message broker becomes unavailable. In such cases, the worker detects the unavailability and transfers additional log messages generated by the AI pipeline directly to the fallback logger. The fallback logger then writes these messages to the log database, ensuring that no log data is lost during the period of message broker downtime. The processor is configured to continuously transmit a keep-alive message from the message broker to the log database. This process continues until a confirmation is received from the log database, indicating that a log message has been successfully written. Upon receiving this confirmation, the message broker deletes the corresponding log message from the queue, thus maintaining the integrity and order of the log data.

The instant solution is configured to execute a fallback logger on the server host, wherein the fallback logger is in communication with the worker and is configured to write messages to the log database. The processor is configured to execute a worker on a server host. The worker includes a log messenger and at least one processing thread, which is responsible for handling log messages generated by AI pipelines and processing various tasks related to these pipelines respectively. The processor executes a message broker on the server host. The message broker is decoupled from the worker and operates independently. It includes a queue that temporarily stores log messages received from the log messenger. The decoupling allows the message broker to handle log messages asynchronously, reducing the load on the worker and ensuring that log messages can be managed efficiently. The fallback logger is executed on the server host and is directly associated with the worker. It serves as an alternative logging mechanism that activates when the message broker is unavailable. The fallback logger is designed to be in communication with the worker, allowing it to receive log messages directly from the worker when necessary.

The fallback logger ensures that log messages continue to be captured and stored even when the message broker is unavailable. When the worker detects that the message broker is not available, possibly due to network issues, server maintenance, or other disruptions, it automatically redirects log messages to the fallback logger. The redirection includes additional log messages generated by the AI pipelines running on the worker.

The fallback logger then writes these log messages to a log database, ensuring that all logging information is preserved despite the temporary unavailability of the message broker. The fallback logger's integration into the solution ensures continuous logging functionality, preventing data loss and maintaining system integrity. This redundancy is expected for applications requiring high availability and reliability, as it guarantees that all log messages are recorded, even in adverse conditions.

The instant solution is configured to include a fallback logger on the server host. The fallback logger is designed to operate in situations where the message broker becomes unavailable. The solution dynamically determines the availability of the message broker, and when it detects that the message broker cannot receive log messages, perhaps due to network failures, server maintenance, or other issues, the solution activates the fallback logger. The fallback logger is in communication with the worker and configured to receive log messages directly from the log messenger. When the message broker is determined to be unavailable, the worker transfers the additional log messages generated by the AI pipeline to the fallback logger. This direct transfer bypasses the message broker, ensuring that no log messages are lost during the period of unavailability. Once the fallback logger receives these log messages, it proceeds to write them to a log database, ensuring that all log information is captured and stored, even when the logging mechanism (the message broker) is offline. The fallback logger continues to function until the message broker becomes available again, at which point, the solution reverts to using the message broker for log message management, with the fallback logger ceasing its direct involvement in logging.

The instant solution is configured to confirm the successful recording of log messages in the log database. The message broker is responsible for continuously transmitting a keep-alive message to the log database. The message serves to verify the connection and availability of the log database. As log messages are transferred from the message broker to the log database, the solution awaits a confirmation message from the log database, indicating that the log message has been successfully written. Upon receiving the confirmation from the log database, the message broker acknowledges that the log message has been securely stored. It then proceeds to delete the corresponding log message from the queue. The deletion process ensures that the queue contains log messages that have not yet been confirmed as written, prevents data duplication, and ensures that the log database accurately reflects the latest state of log messages. The continuous transmission of keep-alive messages and the subsequent confirmation process form a feedback loop that maintains the integrity of the logging system.

The instant solution is configured so that the worker verifies the availability of the message broker before transferring log messages, thus ensuring a reliable and fault-tolerant logging mechanism. The solution includes a message broker, which is decoupled from the worker and includes a queue for storing log messages received from the log messenger. The message broker operates independently, ensuring that the worker's processing tasks are not hindered by the logging process. The queue in the message broker temporarily holds log messages until they can be written to the log database, facilitating an orderly and efficient logging process. The solution uses keep-alive messages to ensure the availability of the message broker before log messages are transferred. The worker transmits a keep-alive message to the message broker to verify its operational status. The message broker, upon receiving the keep-alive message, sends a confirmation of receipt back to the worker. The confirmation indicates that the message broker is available and capable of receiving log messages. Once the worker receives the confirmation, it proceeds to transfer the log messages from the log messenger to the message broker. The transfer is contingent upon the successful receipt of the confirmation, ensuring that log messages are not sent to an unavailable message broker. When the message broker is unavailable, as indicated by the absence of a confirmation response, the worker can take alternative actions, such as utilizing a fallback logger to ensure that log messages are still captured and stored.

The instant solution is configured to listen, by the message broker, to a predefined network port of the worker, and receive the log messages from the worker via the predefined network port. The message broker is decoupled from the worker and includes a queue for storing log messages. The decoupled nature allows the message broker to operate independently, handling log messages without interfering with the worker's processing tasks. The message broker listens to a predefined network port associated with the worker. This listening capability is implemented through a specific network port configured to receive incoming log messages. The network port serves as a designated channel through which the log messenger can send log messages to the message broker. When the worker generates log messages, the log messenger transmits these messages to the predefined network port. The message broker, continuously listening on this port, detects the incoming log messages. Upon detection, the message broker receives the log messages from the worker via this port and stores them in its queue. The queuing process manages the orderly log messages, allowing them to be processed and written to a log database as per their arrival sequence. The use of a predefined network port ensures that the communication between the worker and the message broker is both secure and efficient. It standardizes the method by which log messages are transferred, reducing the potential for data loss or miscommunication. This allows for scalability, as additional workers or message brokers can be configured to use the same or different network ports.

The instant solution is configured to optimize the efficiency of log message handling by the message broker, specifically through the aggregation of log messages. The message broker is decoupled from the worker and includes a queue for storing log messages. The message broker operates independently, managing log messages without disrupting the worker's processing tasks. When multiple log messages are generated by the worker and reach the end of the queue, the message broker is configured to aggregate these log messages together. Aggregation involves grouping multiple individual log messages into a single aggregated plurality of log messages. Once aggregated, the message broker simultaneously writes the grouped set of log messages to the log database. The writing process significantly increases the efficiency of the logging system. By writing multiple log messages at once, rather than individually, the solution reduces the number of write operations required, thereby decreasing the overall time and resource consumption associated with logging. This aggregation mechanism is particularly beneficial in scenarios with a high volume of log messages, allowing the solution to handle large amounts of data more efficiently and maintaining the order of log messages, as the messages are queued and written in the sequence they were received, ensuring the integrity and chronological accuracy of the logs.

In one example, the instant solution is designed to operate in a distributed multi-tier architecture, where the message broker and log database are hosted on separate server clusters to ensure high availability and fault tolerance. The solution includes a memory and a processor coupled to the memory, which executes a worker on a server host. The worker, containing a log messenger and multiple processing threads, generates log messages from executing AI pipelines. The server host also includes a local message broker, which is decoupled from the worker and equipped with a queue for temporarily storing log messages. The local message broker communicates with a remote message broker hosted on a separate secondary server cluster. The remote message broker serves as an intermediary between the local message broker and the log database located on a tertiary server cluster. Log messages are first aggregated by the local message broker and then sent to the remote message broker, which performs a secondary aggregation before writing the messages to the log database. This enhances fault tolerance by providing redundancy; when the local message broker fails, the remote message broker can take over the message queuing and processing tasks. Additionally, this architecture allows for load balancing across multiple server clusters, improving the solution's scalability and reliability.

In another example of the instant solution, the instant solution integrates edge computing and cloud-based components to optimize the logging process for AI pipelines running on distributed edge devices. The solution includes a memory and a processor in an edge device, executing a worker with a log messenger and processing threads. The edge devices are deployed in various locations, generating log messages from localized AI processing, such as real-time data analytics or localized decision-making algorithms. A local message broker is embedded within each edge device, providing initial log message queuing and temporary storage. For capturing log data, the solution includes a cloud-based message broker and a centralized log database. The edge device periodically sends aggregated log messages to the cloud-based message broker over a secure network connection. The cloud-based message broker, also equipped with a queue, performs further aggregation and manages the transfer of log messages to the centralized log database. This dual-layer system ensures that log data is retained locally for quick access and analysis, while comprehensive logs are securely stored in the cloud, reducing latency and bandwidth usage while ensuring reliable and redundant logging capabilities.

In one example of the instant solution, the instant solution employs an AI-driven controller to dynamically determine the optimal deployment location for the logging system based on real-time analysis of system load and AI pipeline attributes. The solution includes a memory and a processor that runs a worker with a log messenger and processing threads on a server host. A message broker with a queue is initially hosted on the same server, ensuring quick and local log message handling. The AI controller, part of the solution's central management, continuously monitors the load attributes of the server host, such as CPU utilization and network traffic, alongside pipeline attributes like the complexity of the AI models and expected execution time. Based on the analysis, the AI controller may decide to relocate the message broker to a secondary remote host when the host experiences high load conditions. The decision criteria are defined by a trained AI model that evaluates historical data and real-time metrics to optimize system performance. Upon determination, the AI controller transfers the message broker and its current queue state to the remote host, which may be in a different data center or cloud environment. The solution reroutes the log messages from the worker to the new message broker location. The allocation reduces the processing burden on the server host, optimizing overall system performance and ensuring uninterrupted logging services.

Figure 6A:
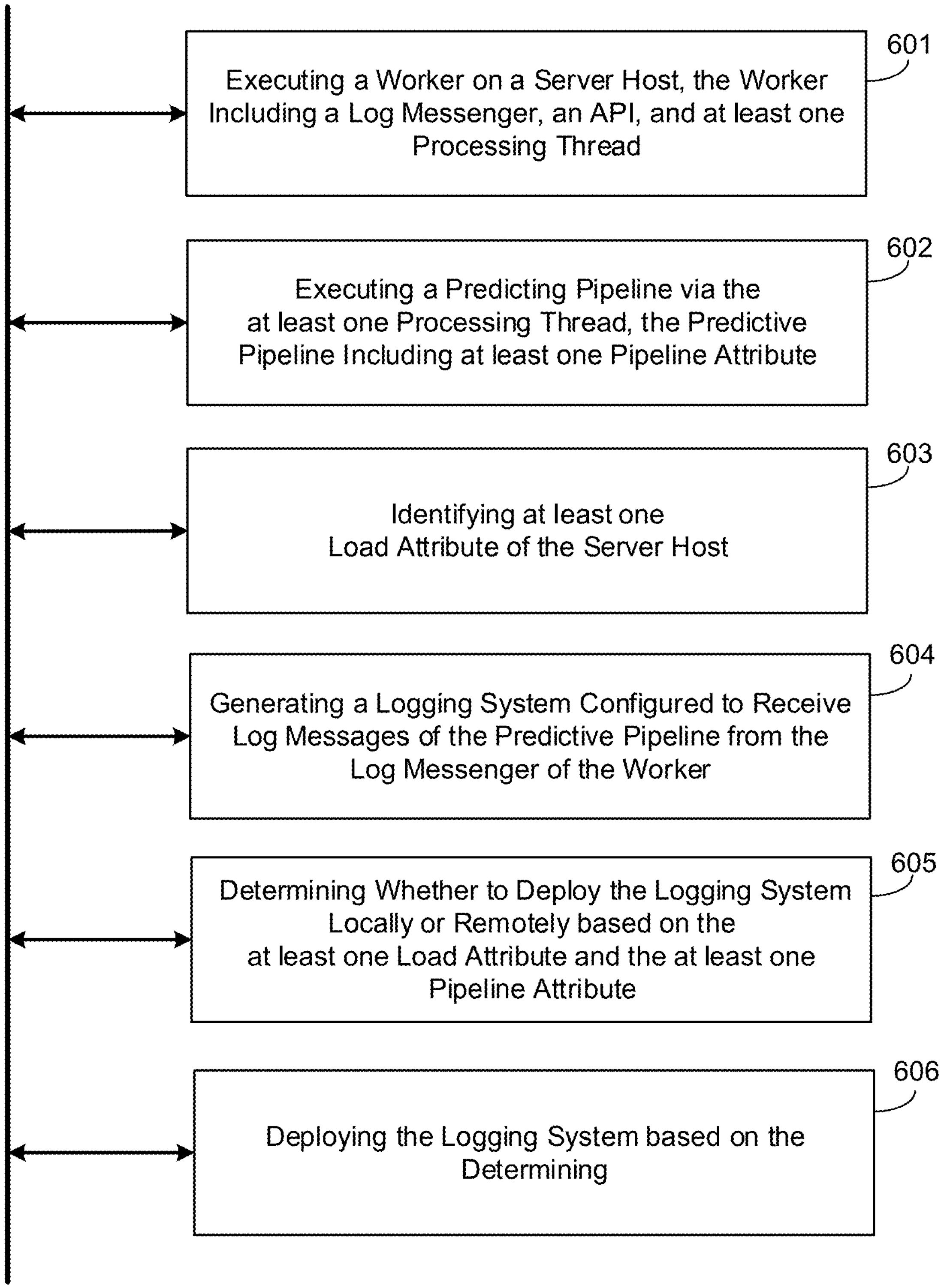
FIGS. 6A-6B are diagrams illustrating a method of dynamically determining a host location for a logging system according to examples and features of the instant solution.

FIG. 6A illustrates a method 600 of dynamically determining a host location for a logging system according to examples and features of the instant solution. For example, the method 600 may be performed by at least one processor of a host platform such as a cloud platform, a web server, a software application, a combination of systems, and the like. Referring to FIG. 6A, in 601, the method may include executing a worker on a server host, wherein the worker includes a log messenger, an application programming interface (API), and at least one processing thread. In 602, the method may include executing a predictive pipeline using the at least one processing thread of the worker, wherein the predictive pipeline includes an artificial intelligence (AI) model and at least one pipeline attribute.

In 603, the method may include identifying at least one load attribute of the server host. In 604, the method may include generating a logging system configured to receive log messages of the predictive pipeline from the log messenger and write the log messages to a log database. In 605, the method may include determining whether to deploy the logging system at the server host or at a remote host based on the at least one load attribute of the server host and the at least one pipeline attribute of the predictive pipeline. In 606, the method may include deploying the logging system based on the determining of whether to deploy the logging system at the server host or the remote host.

Figure 6B:
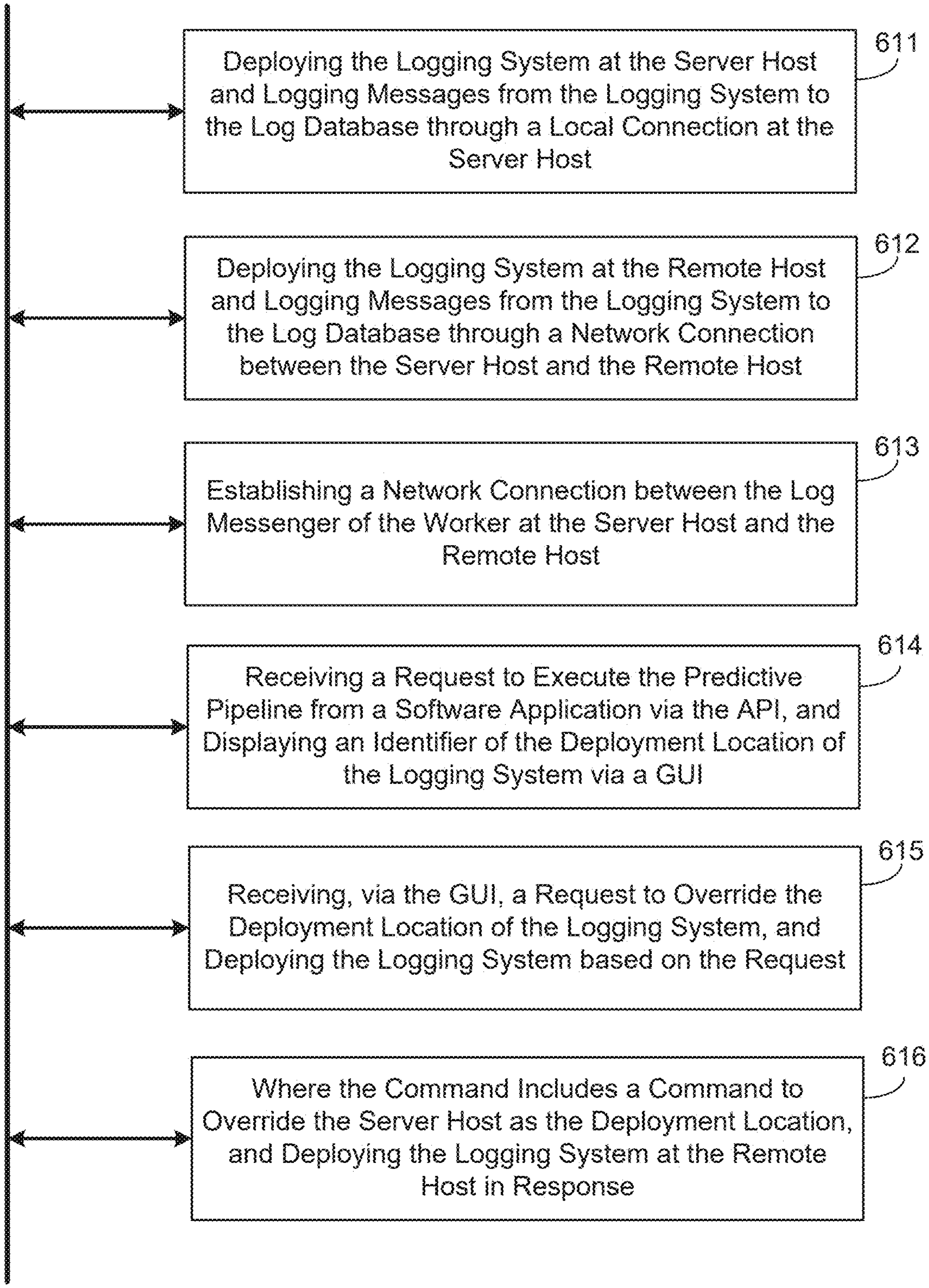

FIG. 6B illustrates a method 610 of dynamically determining a host location for a logging system according to additional examples and features of the instant solution. For example, the method 610 may be performed by at least one processor of a host platform such as a cloud platform, a web server, a software application, a combination of systems, and the like. Referring to FIG. 6B, in 611, the method may include deploying the logging system at the server host based on the at least one load attribute of the server host and the at least one pipeline attribute of the predictive pipeline, and logging messages from the logging system to the log database through a local connection at the server host.

In 612, the method may include deploying the logging system at the remote host, and the method further includes logging messages from the logging system to the log database through a network connection between the server host and the remote host. In 613, the method may further include establishing the network connection between the log messenger of the worker at the server host and the remote host in response to the deploying of the logging system at the remote host.

In 614, the method may further include receiving a request to execute the predictive pipeline from a software application associated via the API, and the method may further include displaying an identifier of a deployment location of the logging system via a graphical user interface (GUI) of the software application. In 615, the method may further include receiving, via an input on the GUI, a request to override the deployment location of the logging system, wherein the deploying includes deploying the logging system based on the request to override. In 616, the method may further include receiving a command to override the server host as the deployment location, and the deploying may include deploying the logging system at the remote host.

Figure 7A:
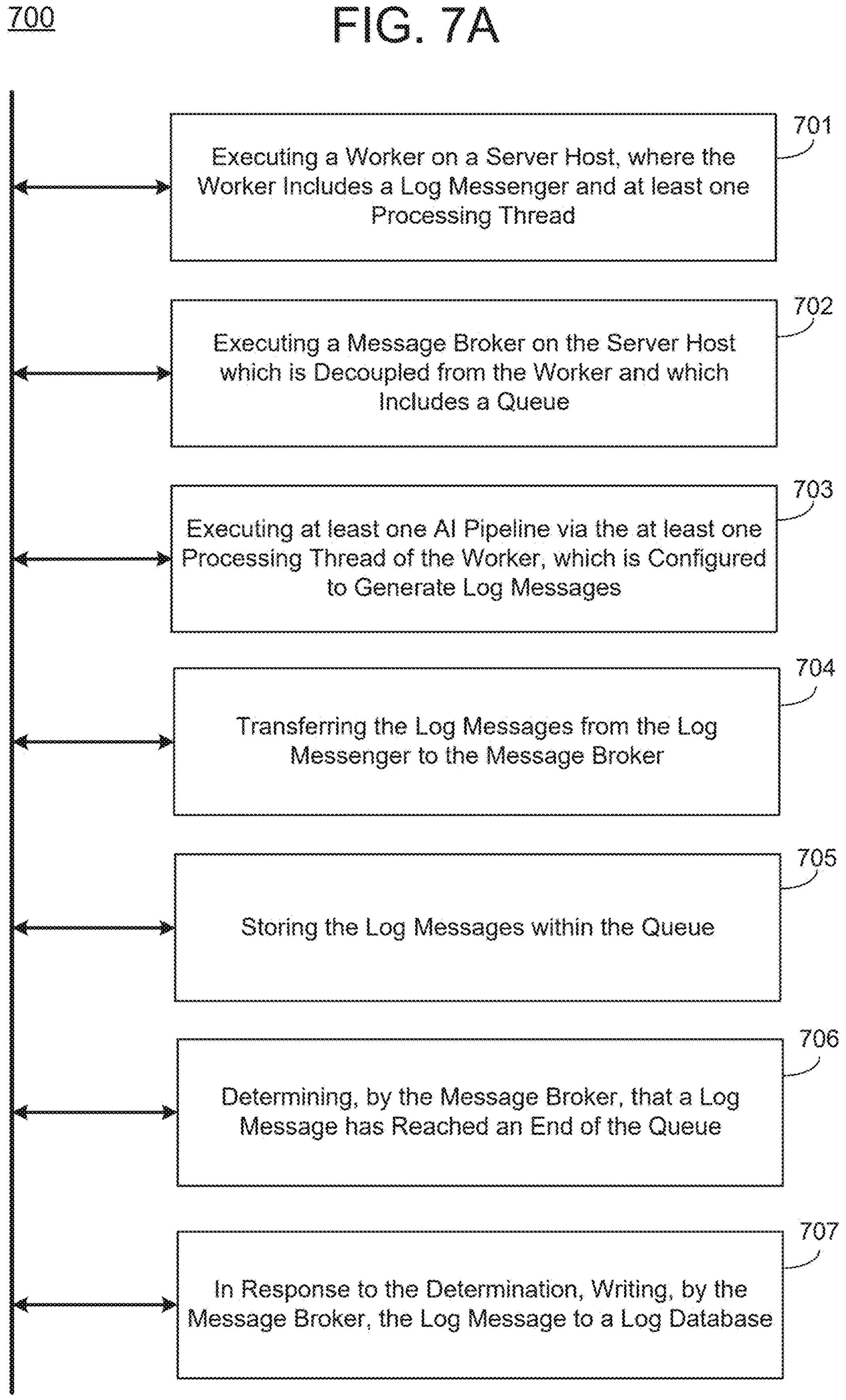
FIGS. 7A-7B are diagrams illustrating a method of fault-tolerant logging for AI applications according to examples and features of the instant solution.

FIG. 7A illustrates a method 700 of fault-tolerant logging for AI applications according to examples and features of the instant solution. For example, the method 700 may be performed by at least one processor of a host platform such as a cloud platform, a web server, a software application, a combination of systems, and the like. Referring to FIG. 7A, in 701, the method may include executing a worker on a server host, wherein the worker may include a log messenger and at least one processing thread. In 702, the method may include executing a message broker on the server host, wherein the message broker is decoupled from the worker and may include a queue.

In 703, the method may include executing at least one artificial intelligence (AI) pipeline via the at least one processing thread of the worker, wherein the at least one AI pipeline is configured to generate log messages. In 704, the method may include transferring the log messages from the log messenger to the message broker. In 705, the method may include storing the log messages within the queue of the message broker. In 706, the method may include determining, by the message broker, that a log message from among the log messages has reached an end of the queue. In 707, in response to a determination that the log message has reached the end of the queue, the method may include writing, by the message broker, the log message to a log database.

Figure 7B:
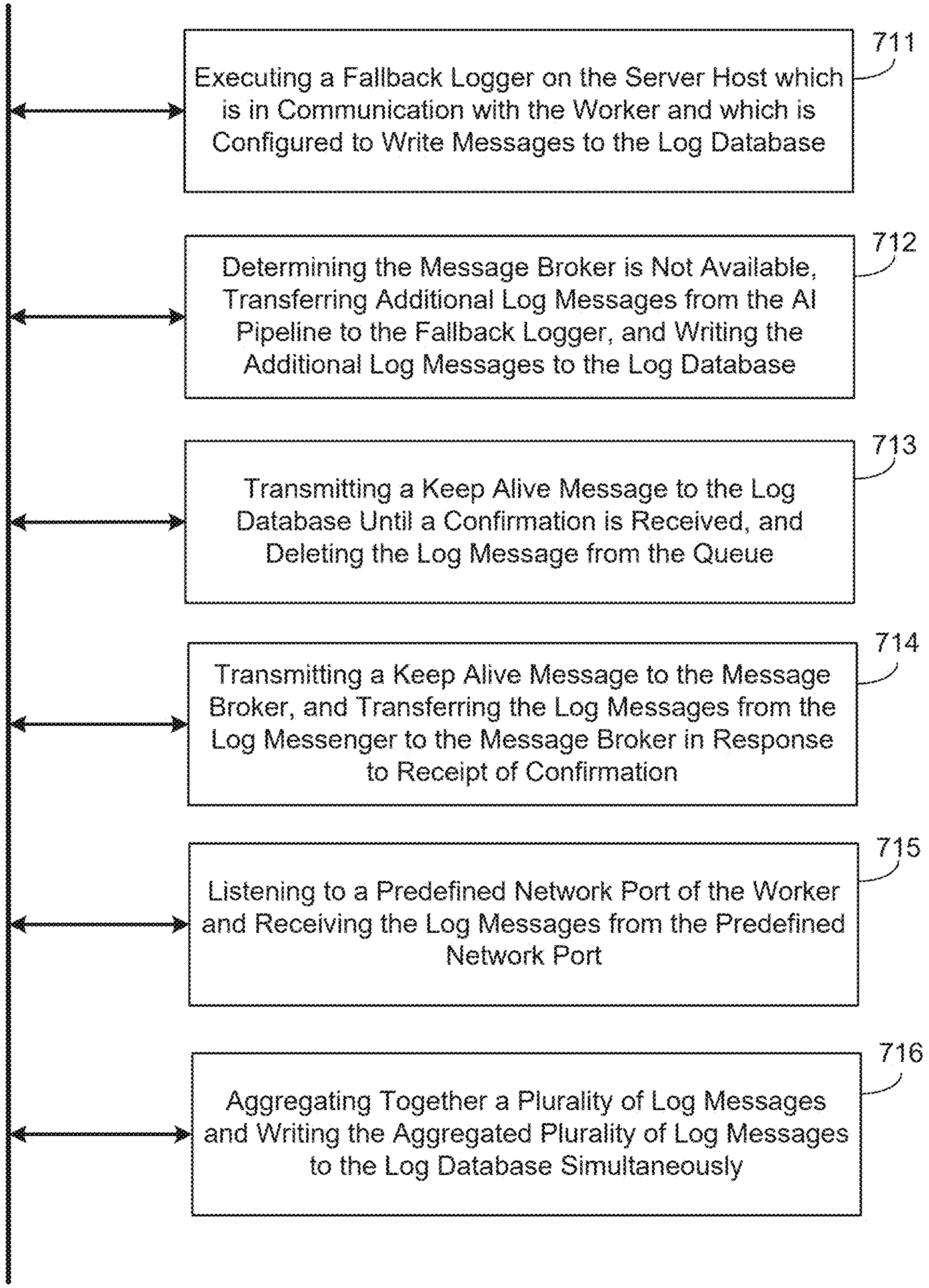

FIG. 7B illustrates a method 710 of fault-tolerant logging for AI applications according to additional examples and features of the instant solution. For example, the method 710 may be performed by at least one processor of a host platform such as a cloud platform, a web server, a software application, a combination of systems, and the like. Referring to FIG. 7B, in 711, the method may include executing a fallback logger on the server host, wherein the fallback logger is in communication with the worker and is configured to write messages to the log database. In 712, the method may include generating additional log messages, determining by the worker that the message broker is not available, transferring additional log messages generated by the at least one AI pipeline to the fallback logger, and writing, by the fallback logger, the additional log messages to the log database, in response to the message broker not being available.

In 713, the method may include continuously transmitting a keep alive message from the message broker to the log database until receiving a confirmation from the log database that the log message has been written, and in response to receiving the confirmation, deleting the log message from the queue. In 714, the method may include transmitting a keep alive message from the worker to the message broker and receiving a confirmation of receipt of the keep alive message from the message broker via the worker, wherein the transferring the log messages from the log messenger to the message broker may include transferring the log messages after receiving the confirmation.

In 715, the method may include listening, by the message broker, to a predefined network port of the worker, and receiving the log messages from the worker via the predefined network port. In 716, the method may include aggregating together, by the message broker, a plurality of log messages that have reached the end of the queue to generate an aggregated plurality of log messages, and simultaneously writing the aggregated plurality of log messages to the log database.

Figure 8:
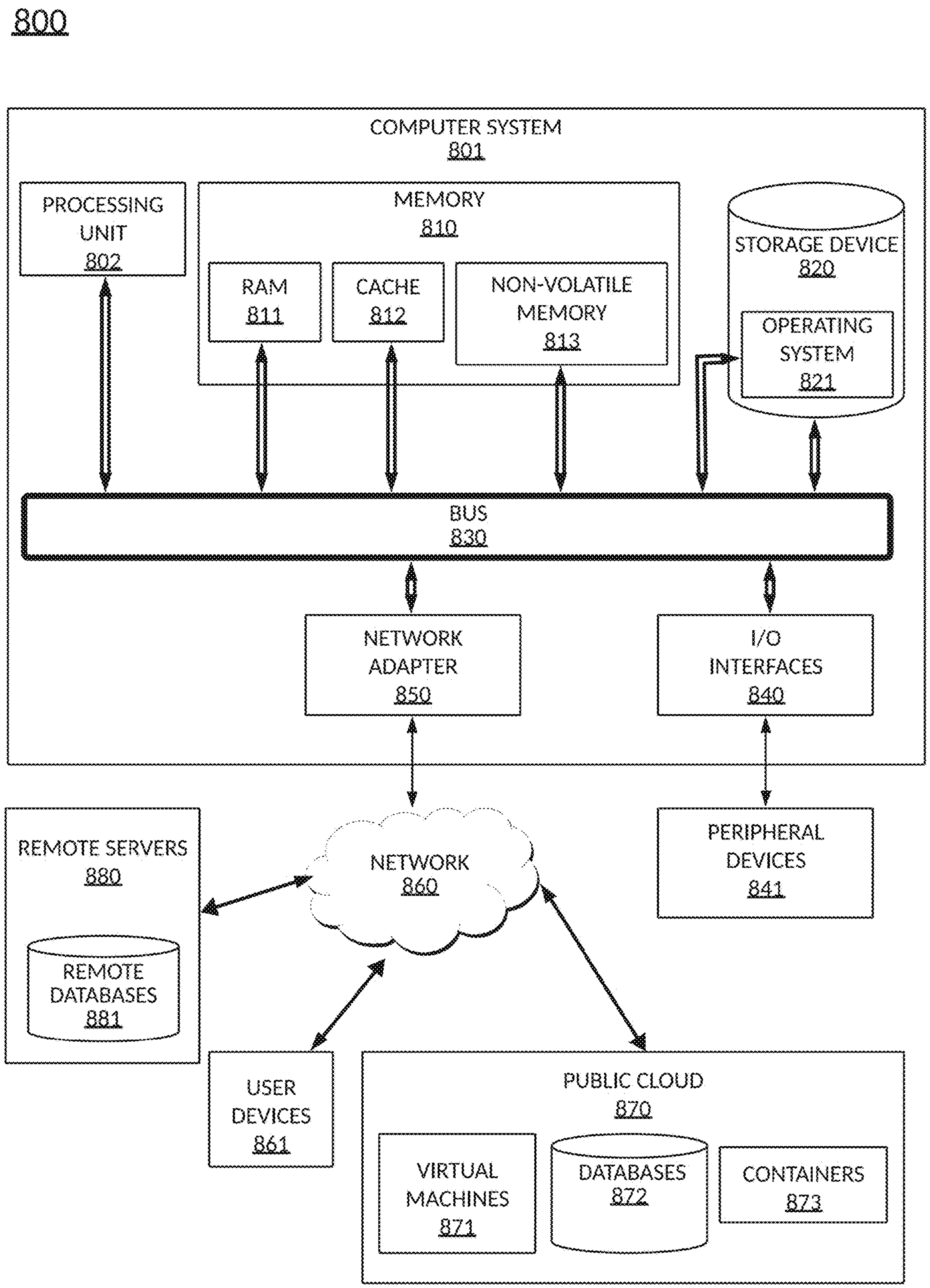
FIG. 8 is a system diagram illustrating a computing environment according to the instant solution's example features, structures, or characteristics.

The examples and features of the instant solution may be implemented in one or more of the elements described or depicted herein, including for example, the elements described or depicted in FIG. 8. These examples and features may further be implemented in hardware, in a computer program executed by a processor, in firmware, or in a combination of the above. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art.

An exemplary storage medium may be communicatively coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components. For example, FIG. 8 illustrates an example computer system architecture, which may represent or be integrated in any of the above-described components, etc.

FIG. 8 illustrates a computing environment according to the instant solution's example features, structures, or characteristics. FIG. 8 is not intended to suggest any limitation as to the scope of use or functionality of features, structures, or characteristics of the instant solution of the application described herein. Regardless, the computing environment 800 can be implemented to perform any of the functionalities described herein. In computing environment 800, there is a computer system 801, operational within numerous other general-purpose or special-purpose computing system environments or configurations.

Computer system 801 may take the form of a desktop computer, laptop computer, tablet computer, smartphone, smartwatch or other wearable computer, server computer system, thin client, thick client, network computer system, minicomputer system, mainframe computer, quantum computer, and distributed cloud computing environment that include any of the described systems or devices, and the like or any other form of computer or mobile device now known or to be developed in the future that is capable of running a program, accessing a network 860 or querying a database. Depending upon the technology, the performance of a computer-implemented method may be distributed among multiple computers and among multiple locations. However, in this presentation of the computing environment 800, a detailed discussion is focused on a single computer, specifically computer system 801, to keep the presentation as simple as possible.

Computer system 801 may be located in a cloud, even though it is not shown in a cloud in FIG. 8. On the other hand, computer system 801 may not be in a cloud except to any extent as may be affirmatively indicated. Computer system 801 may be described in the general context of computer system-executable instructions, such as program modules, executed by a computer system 801. Generally, program modules may include routines, programs, objects, components, logic, data structures, and so on that perform tasks or implement certain abstract data types. As shown in FIG. 8, computer system 801 in computing environment 800 is shown in the form of a general-purpose computing device. The components of computer system 801 may include but are not limited to, at least one processor or processing unit 802, a system memory 810, and a bus 830 that couples various system components, including system memory 810 to processing unit 802.

Processing unit 802 includes at least one computer processor of any type now known or to be developed. The processing unit 802 may contain circuitry distributed over multiple integrated circuit chips. The processing unit 802 may also implement multiple processor threads and multiple processor cores. Cache 812 is a memory that may be in the processor chip package(s) or located "off-chip," as depicted in FIG. 8. Cache 812 is typically used for data or code accessed by the threads or cores running on the processing unit 802. In some computing environments, processing unit 802 may be designed to work with qubits and perform quantum computing.

Memory 810 is any volatile memory now known or to be developed in the future. Examples include dynamic random-access memory (RAM) 811 or static type RAM 811. Typically, the volatile memory is characterized by random access, but this may not be the characterization unless affirmatively indicated. In computer system 801, memory 810 is in a single package. It is internal to computer system 801, but alternatively or additionally, the volatile memory may be distributed over multiple packages and/or located externally with respect to computer system 801. By way of example, memory 810 can be provided for reading from and writing to a non-removable, non-volatile magnetic media (shown as storage device 820, and typically called a "hard drive"). Memory 810 may include at least one program product having a set (e.g., at least one) of program modules configured to carry out the functions of various features, structures, or characteristics of the instant solution of the application. A typical computer system 801 may include cache 812, a specialized volatile memory generally faster than RAM 811 and generally located closer to the processing unit 802. Cache 812 stores frequently accessed data and instructions accessed by the processing unit 802 to speed up processing time. The computer system 801 may also include non-volatile memory 813 in the form of ROM, PROM, EEPROM, and flash memory. Non-volatile memory 813 often contains programming instructions for starting the computer, including the basic input/output system (BIOS) and information to start the operating system 821.

Computer system 801 may include a removable/non-removable, volatile/non-volatile computer storage device 820. For example, storage device 820 can be a non-removable, non-volatile magnetic media (not shown and typically called a "hard drive"). At least one data interface can connect it to the bus 830. In features, structures, or characteristics of the instant solution where computer system 801 has a large amount of storage (for example, where computer system 801 locally stores and manages a large database), then this storage may be provided by peripheral storage devices 820 designed for storing very large amounts of data, such as a storage area network (SAN) that is shared by multiple, geographically distributed computers.

The operating system 821 is software that manages computer system 801 hardware resources and provides common services for computer programs. Operating system 821 may take several forms, such as various known proprietary operating systems or open-source Portable Operating System Interface type operating systems that employ a kernel.

The bus 830 represents at least one of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 830 is the signal conduction path that allows the various components of computer system 801 to communicate.

Computer system 801 may communicate with at least one peripheral device, 841, via an input/output (I/O) interface, 840. Such devices may include a keyboard, a pointing device, a display, etc.; at least one device that enables a user to interact with computer system 801; and/or any devices (e.g., network card, modem, etc.) that enable computer system 801 to communicate with at least one other computing devices. Such communication can occur via I/O interface 840. As depicted, I/O interface 840 communicates with the other components of computer system 801 via bus 830.

Network adapter 850 enables the computer system 801 to connect and communicate with at least one network 860, such as a local area network (LAN), a wide area network (WAN), and/or a public network (e.g., the Internet). It bridges the computer's internal bus 830 and the external network, exchanging data efficiently and reliably. The network adapter 850 may include hardware, such as modems or Wi-Fi signal transceivers, and software for packetizing and/or de-packetizing data for communication network transmission. Network adapter 850 supports various communication protocols to ensure compatibility with network standards. Ethernet connections adhere to protocols such as IEEE 802.3, while wireless communications might support IEEE 802.11 standards, Bluetooth, near-field communication (NFC), or other network wireless radio standards.

Network 860 is any computer network that can receive and/or transmit data. Network 860 can include a WAN, LAN, private cloud, or public Internet, capable of communicating computer data over non-local distances by any technology that is now known or to be developed in the future. Any connection depicted can be wired and/or wireless and may traverse other components that are not shown. In some features, structures, or characteristics of the instant solution, a network 860 may be replaced and/or supplemented by LANs designed to communicate data between devices in a local area, such as a Wi-Fi network. The network 860 typically includes computer hardware such as copper transmission cables, optical transmission fibers, wireless transmission, routers, firewalls, switches, gateway computers, edge servers, and network infrastructure known now or to be developed in the future. Computer system 801 connects to network 860 via network adapter 850 and bus 830.

User devices 861 are any computer systems used and controlled by an end user in connection with computer system 801. For example, in a hypothetical case where computer system 801 is designed to provide a recommendation to an end user, this recommendation may typically be communicated from network adapter 850 of computer system 801 through network 860 to a user device 861, allowing user device 861 to display, or otherwise present, the recommendation to an end user. User devices can be a wide array, including personal computers, laptops, tablets, hand-held, mobile phones, etc.

A public cloud 870 is an on-demand availability of computer system resources, including data storage and computing power, without direct active management by the user. Public clouds 870 are often distributed, with data centers in multiple locations for availability and performance. Computing resources on public clouds 870 are shared across multiple tenants through virtual computing environments comprising virtual machines 871, databases 872, containers 873, and other resources. A container 873 is an isolated, lightweight software for running a software application on the host operating system 821. Containers 873 are built on top of the host operating system's kernel and contain software applications and some lightweight operating system APIs and services. In contrast, virtual machine 871 is a software layer with an operating system 821 and kernel. Virtual machines 871 are built on top of a hypervisor emulation layer designed to abstract a host computer's hardware from the operating software environment. Public clouds 870 generally offers databases 872, abstracting high-level database management activities. At least one element described or depicted in FIG. 8 can perform at least one of the actions, functionalities, or features described or depicted herein.

Remote servers 880 are any computers that serve at least some data and/or functionality over a network 860, for example, WAN, a virtual private network (VPN), a private cloud, or via the Internet to computer system 801. These networks 860 may communicate with a LAN to reach users. The user interface may include a web browser or a software application that facilitates communication between the user and remote data. Such software applications have been referred to as "thin" desktop software applications or "thin clients." Thin clients typically incorporate software programs to emulate desktop sessions. Mobile device software applications can also be used. Remote servers 880 can also host remote databases 881, with the database located on one remote server 880 or distributed across multiple remote servers 880. Remote databases 881 are accessible from database client applications installed locally on the remote server 880, other remote servers 880, user devices 861, or computer system 801 across a network 860. An AI/ML model described or depicted here may reside fully or partially on any of the elements described or depicted in FIG. 8.

Although an exemplary example of the instant solution of at least one of an apparatus, method, and computer readable medium has been illustrated in the accompanying drawings and described in the foregoing detailed description, it will be understood that the instant solution is not limited to the examples of the instant solution disclosed but is capable of numerous rearrangements, modifications, and substitutions as set forth and defined by the following claims. For example, the instant solution's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that the instant solution may be embodied as a personal computer, a server, a console, a personal digital assistant (PDA), a cell phone, a tablet computing device, a smartphone, or any other suitable computing device, or combination of devices. Presenting the above-described functions as being performed by the instant solution is not intended to limit the scope of the present instant solution in any way but is intended to provide one example of the many examples of the instant solution. Indeed, methods, systems, and apparatuses disclosed herein may be implemented in localized and distributed forms consistent with computing technology.

It should be noted that some of the instant solution features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module may not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory, tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the instant solution, as generally described and illustrated in the figures herein, may be arranged and designed in a wide variety of different configurations. Thus, the detailed descriptions of the instant solution and the examples and features of the instant solution are not intended to limit the scope of the instant solution as claimed but are merely representative examples of the instant solution.

One having ordinary skill in the art will readily understand that the above may be practiced with steps in a different order and/or with hardware elements in configurations that are different from those which are disclosed. Therefore, although the instant solution has been described based upon these preferred examples and features of the instant solution, it would be apparent to those of skill in the art that certain modifications, variations, and alternative constructions would be apparent.

While preferred examples of the present instant solution have been described, it is to be understood that the examples described are illustrative only, and the scope of the instant solution is to be defined solely by the appended claims when considered with a full range of equivalents and modifications (e.g., protocols, hardware devices, software platforms, etc.) thereto.

What is claimed is:

1. An apparatus comprising:

a memory; and a processor coupled to the memory, and configured to:

execute a worker on a server host, wherein the worker comprises a log messenger and at least one processing thread, determine a deployment location for a message broker from among the server host and a remote host based on at least one predicted logging attribute of an artificial intelligence (AI) pipeline executed by the worker, execute the message broker at the deployment location, execute the AI pipeline via the at least one processing thread of the worker to generate log messages, transfer the log messages from the log messenger to the message broker, store the log messages within a queue of the message broker, and in response to a determination that a log message has reached an end of the queue, write, by the message broker, the log message to a log database.

2. The apparatus of claim 1, wherein the processor is further configured to execute a fallback logger on the server host, wherein the fallback logger communicates with the worker and is configured to write messages to the log database when the message broker is not available.

3. The apparatus of claim 2, wherein the AI pipeline is configured to generate additional log messages, and the processor is further configured to determine, by the worker, that the message broker is not available, transfer the additional log messages to the fallback logger, and write, by the fallback logger, the additional log messages to the log database.

4. The apparatus of claim 1, wherein the processor is configured to continuously transmit a keep alive message from the message broker to the log database until receipt of a confirmation from the log database that the log message has been written, and in response to receipt of the confirmation, delete the log message from the queue.

5. The apparatus of claim 1, wherein the processor is configured to transmit a keep alive message from the worker to the message broker and receive a confirmation of receipt of the keep alive message from the message broker via the worker, wherein the processor is configured to transfer the log messages from the log messenger to the message broker after receipt of the confirmation.

6. The apparatus of claim 1, wherein the processor is configured to listen, by the message broker, to a predefined network port of the worker, and receive the log messages from the worker via the predefined network port.

7. The apparatus of claim 1, wherein the processor is further configured to aggregate together, by the message broker, a plurality of log messages that have reached the end of the queue to generate an aggregated plurality of log messages, and simultaneously write the aggregated plurality of log messages to the log database.

8. The apparatus of claim 1, wherein the processor is configured to predict a rate of log message generation by the AI pipeline, and deploy the message broker at the remote host in response to the rate exceeding a threshold associated with the server host.

9. A method comprising:

executing, by a processor, a worker on a server host, wherein the worker comprises a log messenger and at least one processing thread;

determining, by the processor, a deployment location for a message broker from among the server host and a remote host based on at least one predicted logging attribute of an artificial intelligence (AI) pipeline executed by the worker;

executing, by the processor, the message broker at the deployment location;

executing, by the processor, at least one artificial intelligence (AI) pipeline via the at least one processing thread of the worker to generate log messages;

storing, by the processor, the log messages within a queue of the message broker; and in response to a determination that a log message has reached an end of the queue, writing, by the message broker, the log message to a log database.

10. The method of claim 9, comprising executing a fallback logger on the server host, wherein the fallback logger communicates with the worker and is configured to write messages to the log database when the message broker is not available.

11. The method of claim 10, wherein the AI pipeline comprises generating additional log messages, and the method further comprises determining by the worker that the message broker is not available, transferring additional log messages to the fallback logger, and writing, by the fallback logger, the additional log messages to the log database.

12. The method of claim 9, comprising continuously transmitting a keep alive message from the message broker to the log database until receiving a confirmation from the log database that the log message has been written, and in response to receiving the confirmation, deleting the log message from the queue.

13. The method of claim 9, comprising transmitting a keep alive message from the worker to the message broker and receiving a confirmation of receipt of the keep alive message from the message broker via the worker, wherein the transferring the log messages from the log messenger to the message broker comprises transferring the log messages after receiving the confirmation.

14. The method of claim 9, comprising listening, by the message broker, to a predefined network port of the worker, and receiving the log messages from the worker via the predefined network port.

15. The method of claim 9, comprising aggregating together, by the message broker, a plurality of log messages that have reached the end of the queue to generate an aggregated plurality of log messages, and simultaneously writing the aggregated plurality of log messages to the log database.

16. A non-transitory computer-readable storage medium comprising instructions which when executed by a computer cause a processor to perform:

executing a worker on a server host, wherein the worker comprises a log messenger and at least one processing thread;

determining a deployment location for a message broker from among the server host and a remote host based on at least one predicted logging attribute of an artificial intelligence (AI) pipeline executed by the worker;

executing the message broker at the deployment location;

executing the AI pipeline via the at least one processing thread of the worker to generate log messages;

transferring the log messages from the log messenger to the message broker;

storing the log messages within a queue of the message broker; and in response to a determination that a log message has reached an end of the queue, writing, by the message broker, the log message to a log database.

17. The non-transitory computer-readable storage medium of claim 16, wherein the processor is further configured to perform executing a fallback logger on the server host, wherein the fallback logger communicates with the worker and is configured to write messages to the log database when the message broker is not available.

18. The non-transitory computer-readable storage medium of claim 17, wherein the executing the at least one AI pipeline comprises generating additional log messages, and the processor is further configured to perform determining by the worker that the message broker is not available, transferring the additional log messages to the fallback logger, and writing, by the fallback logger, the additional log messages to the log database.

19. The non-transitory computer-readable storage medium of claim 16, wherein the processor is further configured to perform continuously transmitting a keep alive message from the message broker to the log database until receiving a confirmation from the log database that the log message has been written, and in response to receiving the confirmation, deleting the log message from the queue.

20. The non-transitory computer-readable storage medium of claim 16, wherein the processor is further configured to perform listening, by the message broker, to a predefined network port of the worker, and receiving the log messages from the worker via the predefined network port.

* * * * *